US012684365B2

(12) United States Patent
Ramalingam et al.

(10) Patent No.: US 12,684,365 B2
(45) Date of Patent: Jul. 14, 2026

(54) SYSTEM AND METHODS FOR DOWNLINK PHYSICAL RESOURCE BLOCKS BLANKING AND RELATED OPERATIONS IN THE CELLULAR SYSTEMS OPERATING IN SHARED SPECTRUM

(71) Applicant: Mavenir Systems, Inc., Richardson, TX (US)

(72) Inventors: Manoharan Ramalingam, Bengaluru (IN); Sunil Kaimalettu, Hebbal Kempapura (IN)

(73) Assignee: Mavenir Systems, Inc., Richardson, TX (US)

( * ) Notice: Subject to any disclaimer, the term of this patent is extended or adjusted under 35 U.S.C. 154(b) by 357 days.

(21) Appl. No.: 18/457,880

(22) Filed: Aug. 29, 2023

(65) Prior Publication Data

US 2024/0107328 A1 Mar. 28, 2024

Related U.S. Application Data

(60) Provisional application No. 63/402,343, filed on Aug. 30, 2022.

(51) Int. Cl.
| | |
|---|---|
| *H04W 16/14* | (2009.01) |
| *H04L 5/00* | (2006.01) |
| *H04W 72/1273* | (2023.01) |
| *H04W 72/232* | (2023.01) |

(52) U.S. Cl.
CPC ........... *H04W 16/14* (2013.01); *H04L 5/0051* (2013.01); *H04W 72/1273* (2013.01); *H04W 72/232* (2023.01)

(58) Field of Classification Search
CPC ............... H04W 16/14; H04W 72/232; H04W 72/1273; H04L 5/0051
USPC ........................................................ 370/329
See application file for complete search history.

(56) References Cited

U.S. PATENT DOCUMENTS

| | | | | |
|---|---|---|---|---|
| 2009/0290597 A1* | 11/2009 | Baumgartner | ........ | H04L 5/0044 |
| | | | | 370/468 |
| 2012/0040704 A1* | 2/2012 | Kim | ...................... | H04L 5/0064 |
| | | | | 455/509 |
| 2023/0344580 A1* | 10/2023 | Sohrabi | ................. | H04L 5/0048 |
| 2024/0057144 A1* | 2/2024 | Zufall | ................. | H04W 72/541 |

FOREIGN PATENT DOCUMENTS

| | | | | |
|---|---|---|---|---|
| WO | WO-2017016588 A1 * | 2/2017 | ........... | H04L 5/0023 |

OTHER PUBLICATIONS

3GPP TS 38.211 V17.2.0 "3rd Generation Partnership Project; Technical Specification Group Radio Access Network; NR;Physical channels and modulation (Release 17)", Jun. 2022, 3rd Generation Partnership Project (3GPP), Valbonne, France.

(Continued)

*Primary Examiner* — Peter G Solinsky
(74) *Attorney, Agent, or Firm* — Ruggiero McAllister & McMahon LLC

(57) ABSTRACT

System and Methods for configuring shared spectrum cellular systems with Physical Resource Block Blanking and related operations for the control and data channels and reference signals within the carrier channel bandwidth. The systems are configured for protection in the carrier bandwidth to avoid victim interference mitigation.

20 Claims, 10 Drawing Sheets

PRB Blanking Configuration 1

PRB Blanking Configuration 2

PRB Blanking Configuration 3

(56)          References Cited

OTHER PUBLICATIONS

3GPP TS 38.213 V17.2.0 "3rd Generation Partnership Project; Technical Specification Group Radio Access Network; NR;Physical layer procedures for control (Release 17)" Jun. 2022, 3rd Generation Partnership Project (3GPP), Valbonne, France.

3GPP TS 38.214 V17.2.0 "3rd Generation Partnership Project; Technical Specification Group Radio Access Network; NR;Physical layer procedures for data (Release 17)" Jun. 2022, 3rd Generation Partnership Project (3GPP), Valbonne, France.

3GPP TS 38.331 V17.1.0 "3rd Generation Partnership Project; Technical Specification Group Radio Access Network; NR;Radio Resource Control (RRC) protocol specification (Release 17)" Jun. 2022, 3rd Generation Partnership Project (3GPP), Valbonne, France.

Extended European search report for corresponding European application EP23194212.9, 7 pages, dated Feb. 8, 2024.

ETRI: "Discussion on numerology for NR", 3GPP Draft; RI-164870 Discussion on Numerology For NR, 3rd Generation Partnership Project (3GPP), Mobile Competence Centre; 650, Route Des Lucioles; F-06921 Sophia-Antipolis Cedex ; France; vol. RAN WGL, No. Nanjing, China; May 23, 2016-May 27, 2016; May 14, 2016.

* cited by examiner frequency Domain Resources Assignment bit map—>
8 bits of RBGs for config 2

SYSTEM AND METHODS FOR DOWNLINK PHYSICAL RESOURCE BLOCKS BLANKING AND RELATED OPERATIONS IN THE CELLULAR SYSTEMS OPERATING IN SHARED SPECTRUM

CROSS REFERENCE TO RELATED APPLICATIONS

This application claims priority to U.S. Provisional Patent Application No. 63/402,343 filed on Aug. 30, 2022, the entirety of which is incorporated herein by reference.

BACKGROUND a. Field of the Disclosure

The present disclosure relates to systems and methods for radio access networks. The present disclosure focuses on the design of operation, administration and management of various network elements of 4G and 5G based mobile networks.

a. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU).

For the RRU and DU to communicate, an interface called the fronthaul is provided. 3rd Generation Partnership Project (3GPP) has defined 8 options for the split between the BBU and the RRU among different layers of the protocol stack. There are multiple factors affecting the selection of the fronthaul split option such as bandwidth, latency, implementation cost, virtualization benefits, complexity of the fronthaul interface, expansion flexibility, computing power, and memory requirement. One of the splits recently standardized by O-RAN Alliance is split option 7–2× (Intra-Physical (PHY) layer split). In the uplink (UL), Fast Fourier Transform (FFT), Cyclic Prefix (CP) removal, and possibly pre-filtering functions reside in the RU, while the rest of PHY functions reside in the DU. In the downlink (DL), inverse Fast Fourier Transform (iFFT), CP addition, and beamforming functions reside in the RU, the rest of PHY functions reside in the DU. This split has multiple advantages such as simplicity, transport bandwidth scalability, beamforming support, interoperability, support for advanced receivers and inter-cell coordination, lower O-RU complexity, future proof-ness, interface and functions symmetry.

One example of the technologies recently standardized is operation over shared spectrum such as Citizens Broadband Radio Service (CBRS) band in the U.S. from 3.55 GHz-3.7 GHz. Similar shared spectrum paradigms also exist in other countries. CBRS opens new ways to use spectrum in the 3.5 GHz band in the US by sharing spectrum across legacy and new users. There are 3 tiers of users sharing the CBRS band. The first tier includes "incumbents," who are legacy/existing users of the CBRS band, e.g., military ship-borne radars in coastal areas, military ground-based radars, fixed satellite services (FSS) receive-only earth stations (35 sites around US, mostly in coastal areas), and Grandfathered Wireless Broadband Licensees (GWBL). The second tier includes Priority Access License (PAL) users, who are CBRS devices (CBSDs) having one or more licenses to use a portion of the CBRS band. PAL users, who have a lower priority than incumbents, are restricted to a total of 70 MHz within 3.55-3.65 GHz band in the CBRS band. The third tier includes General Authorized Access (GAA) users, who are CBSDs using the CBRS band without holding a license. GAA users, who have a lower priority than PAL users, are the lowest tier of the 3-tier architecture. GAA users can only use the spectrum if no incumbents or PAL users are using the channel at a given location. GAA users have access to the entire 150 MHz of the CBRS band.

The coexistence and sharing of spectrum between International Mobile Telecommunications (IMT) systems and other systems like satellite and government defense network systems has become recently critical point of discussion due to emerging new technologies and spectrum scarcity. Regulators may consider allowing sharing of spectrum to maximize efficient use of available spectrum. For example, in USA, FCC has allocated the same licensed frequency band (5G n70 band) both for IMT systems and already existing satellite services, where the IMT system n70 band partially overlaps with the spectrum used by incumbent satellite systems, in the future the plan may be for the incumbent satellite systems to migrate to another spectrum band.

This sharing of licensed spectrum temporarily or permanently by two entities respectively the IMT systems based cellular operator and the incumbent systems (victim systems), may not share the spectrum throughout the country, this spectrum sharing may happen in few geographical locations within the country in so called few cellular operator markets that too may be in specific time. In these geographical locations the cellular operator IMT technology-based systems should satisfy the regulatory requirements by muting or blanking the partial spectrum or frequency used by the incumbent satellite systems.

For example, the USA cellular operator who is deploying IMT based systems in this 5G n70 band should satisfy the regulatory requirement by having an algorithm that works by evaluating the spectral leakage at frequencies/tones for Physical Resource Blocks (PRBs) to be nulled and finding a set of coefficients to be used at those frequencies to cancel the spectral leakage, and along with these extra tones for PRBs can be added to provide the interference cancellation for Radio Units and the Base band units of IMT based base station systems.

SUMMARY

The present disclosure provides embodiments that make efficient use of spectrum bands with resource blanking requirements, which otherwise cannot be used for IMT systems.

In implementations, described is a method and system in which 4G/LTE or 5G or BSG (IMT) systems operating in shared spectrum is built with a framework for PRB Blanking the Control channels, Data channels and reference signals within the carrier channel bandwidth for protection, to avoid victim interference mitigation. Victim interference refers to interference from non-cellular systems operating in a same carrier channel bandwidth, either fully or partially in the shared spectrum.

In an implementation, the framework includes provisioning a Base Station with a set of PRBs for blanking or muting. The Base Station is thereby configured to directly and/or indirectly mute or blank the provisioned PRBs in the operating carrier bandwidth, which can be transparent or/and non-transparent to UEs.

In another implementation, the framework includes a Base Station and UEs operating in the shared spectrum, where the set of physical resource blocks are blanked or muted. So, the provisioned blanked PRB will make the system operate on non-contiguous carrier bandwidth with all control channels, data channels and reference signals. Both the Base station and UEs will be able to receive the data channels and control channels in contiguous or/and non-contiguous carrier bandwidth.

In another implementation, the framework can be employed using 3GPP standard based techniques to blank or mute PRBs in the shared spectrum.

In an implementation, described is a method comprising: configuring a base station operating in a carrier bandwidth a Physical Resource Block (PRB) Blanking Configuration for at least one PRB blanking region for a protection zone in the carrier bandwidth; the base station being configured to add one or more PRBs to a predefined blanking frequency and vary the size of a blanking region for the PRBs. The method can comprise: identifying one or more Resource Block Groups (RGB) for the PRB blanking region not being used for scheduling a data transmission; and blanking the PRBs in the carrier bandwidth that overlap with the one or more RGBs that are not being used for the scheduling the data transmission. This method can comprise: identifying one or more non-blanked PRBs in an RBG that is not used for scheduling a data transmission, wherein one or more RBGs which are not used for scheduling the data transmission comprises one or more PRBs that are not blanked for the at least one PRB blanking Configuration.

The method can further comprise: determining if a plurality of contiguous PRBs are available for signal transmission; and; if so, scheduling a MSG2/RAR in the contiguous PRBs. This method can further comprise; identifying unused PRBs and; scheduling data in the unused PRBs for multi-slot transmission to UEs in the DL.

This method can also comprise: identifying a range of PRBs each for at least one PRB blanking region;

identifying one or more RGBs that can be used for scheduling the data transmission;

identifying the one or more RBGs for the PRB blanking region that are not being used for the scheduling the data transmission;

calculating a number of RBGs in the carrier bandwidth, the calculating being the number of PRBs in the carrier bandwidth divided by an RBG size;

identifying a starting RBG that overlaps with the first PRB in the PRB blanking region, the identification being by calculating a starting PRB for the range of PRBs in the at least one PRB blanking region divided by the RBG size;

calculating the number of PRBs in the at least one PRB blanking region, wherein the calculating the number of the at least one PRB blanking region is by calculating from the end PRB for the range of PRBs in the at least one PRB blanking region minus the starting RBG that overlaps with the first PRB in the PRB blanking region plus an additional PRB;

start the PRB blanking from the starting RBG, wherein the operation starts by calculating the RGB floor multiplied by the RBG size to obtain a number of PRBs in the PRB blanking region that overlaps with the first RBG;

calculating the number of PRBs in the blanking region overlapping the RBG, wherein the calculation is the RBG size minus the number of the PRB in the blanking region that overlaps with the first RBG the blanking region overlapping RBG; and calculating the number of PRBs required from the next RBG, the calculation being the number of PRBs in the at least one PRB blanking region minus the number of PRBs in the blanking region overlapping the RBG.

In an implementation, the method can comprise the at least one blanking region comprises an edge PRB blanking region at the edge of the carrier bandwidth, a middle PRB blanking region in the middle of the carrier bandwidth, or both.

In an implementation, the method can comprise: configuring the base station with a PRB Blanking Configuration that blanks a plurality of the PRB blanking regions for a plurality of the protection zones in the carrier bandwidth. The plurality of the protection zones in the carrier bandwidth the plurality of blanking regions can comprise an edge PRB blanking region at the edge of the carrier bandwidth and a middle PRB blanking region in the middle of the carrier bandwidth.

In an implementation, the method can comprise: configuring a DL scheduler with Resource Allocation Type 0 (RAT0); and scheduling or allocating the PRBs by using the RAT0 based on a User Equipment's PRB requirements such that there is no PRB wastage in a Transit Time Interval.

In an implementation, the method can comprise: configuring a DL scheduler with a Dynamic Switch configured to switch between a plurality of Resource Allocation Types (RAT); and scheduling or allocating the PRBs by dynamically switching between the plurality of RATs based on a User Equipment's PRB requirements such that there is no PRB wastage in a Transit Time Interval.

In an implementation, the method can comprise: transmitting control channels and reference signals in the non-blanked PRB regions. The control channels and reference signals can include: a Synchronization Signal/PBCH block (SSB), a Physical Downlink Control Channel (PDCCH), a CSI-RS (Channel State Information-Reference Signal), a CSI-IM (Channel Status Information Interference Measurement Reference Signal), a T-RS (Tracking Reference Signal), or any combination thereof. The method can further comprise: distributing unused power from the blanked PRBs and distributing the power across non-blanked PRBs. The method can further comprise: distributing the unused power from the blanked PRBs equally across the non-blanked PRBs. The SSB power may not be boosted and can remain same for given Transmit power of Radio Unit (RU) and a cell coverage. The method can further comprise after distributing the power equally across the non-blanked PRBs, boosting a CSI-RS signal. The method of can also further comprise: after distributing the power equally across the non-blanked PRBs, boosting a PDSCH Energy Per Resource Element (EPRE) to a Demodulation Reference Signal (DMRS) EPRE ratio. The method of can also further comprise: boosting the CSI-RS signal by taking the power from REs in the same OFDM (Orthogonal Frequency-Division Multiplexing) symbol of the CSI-RS. The method can further comprise: placing the SSB/PBCH in a PRB to avoid the total number PRBs wasted. This method of can further comprise: placing the SSB to overlap with unused PRBs created by the PRB blanking in the carrier bandwidth such a total number unused PRBs is less than when the SSB is placed a lower edge of the bandwidth.

In an implementation, described is system comprising: a base station operating in a shared spectrum comprising a Downlink DL scheduler configured to blank Physical Resource Blocks (PRBs) for a PRB Blanking Configuration, the base station being configured to add one or more PRBs to a predefined blanking frequency and vary the size of a blanking region for the PRBs. The system can comprise: the DL scheduler being configured with Resource Allocation Type 0 (RAT0), the DL scheduler being configured to schedule or allocate the PRBs by using the RAT0 based on a User Equipment's PRB requirements such that there is no PRB wastage in a Transit Time Interval. The DL scheduler can be configured with a Dynamic Switch to switch between a plurality of Resource Allocation Types (RATs) and schedule or allocate PRBs by dynamically switching between the plurality of RATs based on a User Equipment's PRB requirements such that there is no PRB wastage in a Transit Time Interval. The base station can be further configured to at least: identify one or more Resource Block Groups (RGB) for the PRB blanking region not being used for scheduling a data transmission; and blank the PRBs in the carrier bandwidth that overlap with the one or more RGBs that are not being used for the scheduling the data transmission. The base station can be further configured to at least:

identify a range of PRBs each at least one PRB blanking region;

identify one or more Resource Block Groups (RGB) that can be used for scheduling;

identify the one or more RBGs for the PRB blanking region that cannot be used for scheduling;

calculate a number of RBGs in the carrier bandwidth, the calculating being the number of PRBs in the carrier bandwidth divided by an RBG size;

identify a starting RBG that overlaps with the first PRB in the PRB blanking region, the identification being by calculating a starting PRB for the range of PRBs in the at least one PRB blanking region divided by the RBG size;

calculate the number of PRBs in the at least one PRB blanking region, wherein the calculating the number of the at least one PRB blanking region is by calculating from the end PRB for the range of PRBs in the at least one PRB blanking region minus the starting RBG that overlaps with the first PRB in the PRB blanking region plus an additional PRB;

start the PRB blanking from the starting RBG, wherein the operation starts by calculating the RGB floor multiplied by the RBG size to obtain a number of PRBs in the PRB blanking region that overlaps with the first RBG; calculate the number of PRBs in the blanking region overlapping the RBG, wherein the calculation is the RBG size minus the number of the PRB in the blanking region that overlaps with the first RBG the blanking region overlapping RBG; and calculate the number of PRBs required from the next RBG, the calculation being the number of PRBs in the at least one PRB blanking region minus the number of PRBs in the blanking region overlapping the RBG.

The base station can further be configured to at least: wherein the at least one blanking region comprises an edge PRB blanking region at the edge of the carrier bandwidth, a middle PRB blanking region in the middle of the carrier bandwidth, or both.

The base station can further be configured for a PRB Blanking Configuration that blanks a plurality of the PRB blanking regions for a plurality of protection zones in the carrier bandwidth. The plurality of blanking regions can comprise both the edge PRB blanking region and the middle PRB blanking region.

The base station can further be configured to at least: transmit control channels and reference signals in the non-blanked PRB regions. The base station can further be configured to at least: identify one or more non-blanked PRBs in a RBG that is not used for scheduling a data transmission, wherein one or more RBGs which are not used for scheduling the data transmission comprises one or more PRBs that are not blanked for the at least one PRB Blanking Configuration. The system is further configured to at least: determine if a plurality of contiguous PRBs are available for signal transmission; and; if so, scheduling a Msg2/RAR (Message-2/Random Access Response) in the contiguous PRBs. The system can further be configured to at least: identify unused PRBs and; schedule data in the unused PRBs for multi-slot transmission to UEs (User Equipment) in the DL. The control channels and reference signals include: Synchronization Signal/PBCH block (SSB), a Physical Downlink Control Channel (PDCCH), a CSI-RS (Channel State Information-Reference Signal), a CSI-IM (Channel Status Information Interference Measurement Reference Signal), a T-RS (Tracking Reference Signal), or any combination thereof. The system can further be configured to distribute the unused power from the blanked PRBs equally across the non-blanked PRBs. The system can further be configured to: boost a CSI-RS (Channel State Information-Reference Signal) signal after distributing the power equally across the non-blanked PRBs. The system can further be configured to: boost the CSI-RS signal by taking the power from REs in the same OFDM (Orthogonal Frequency-Division Multiplexing) symbol of the CSI-RS. The system can further be configured to: after distributing the power equally across the non-blanked PRBs, boosting a PDSCH Energy Per Resource Element (EPRE) to a Demodulation Reference Signal (DMRS) EPRE ratio. The system can further be configured so that the SSB power is not boosted and remains same for given Transmit power of Radio Unit (RU) and a cell coverage. The system is can further be configured to at least: place a SSB in a PRB to avoid the total number PRBs wasted. The system is further configured to at least: place the SSB to overlap with unused PRBs created by the PRB blanking in the carrier bandwidth such a total number unused PRBs is less than when the SSB is placed a lower edge of the bandwidth.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference can be configured to be made to the following Detailed Description, which is to be read in association with the accompanying drawings.

Various embodiments and implementations now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments and implementations set forth herein; rather, these embodiments and implementations are provided so that this disclosure will be thorough and complete, and will fully convey the scope of the embodiments and implementations to those skilled in the art. Among other things, the various embodiments and implementations can be methods, systems, media, or devices. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
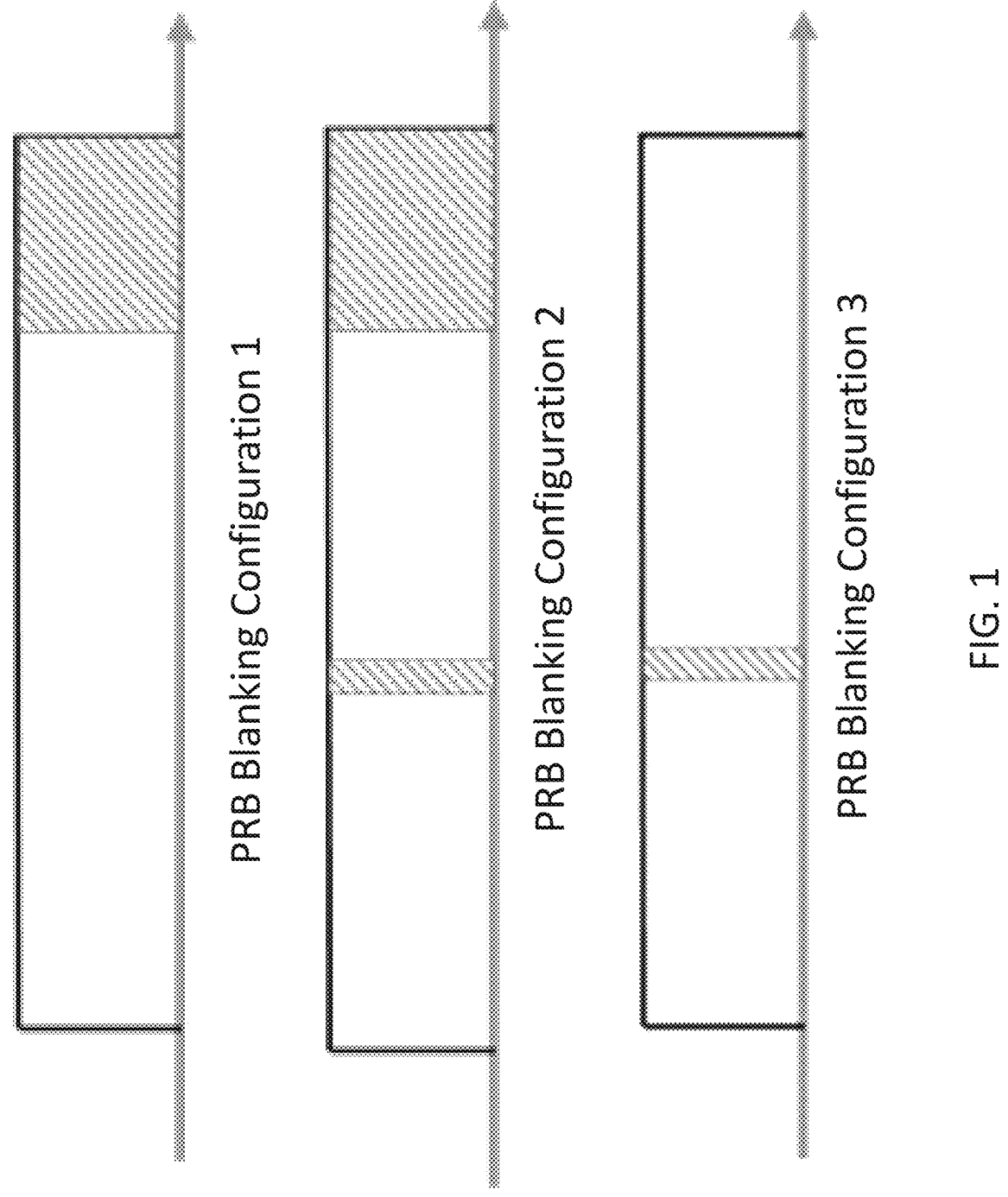
Figure 2:
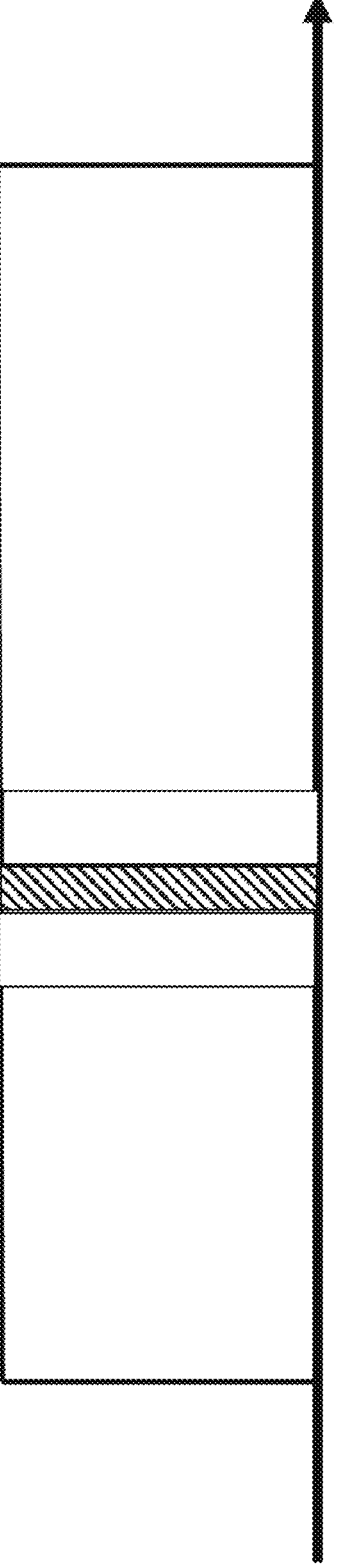
Figure 3:
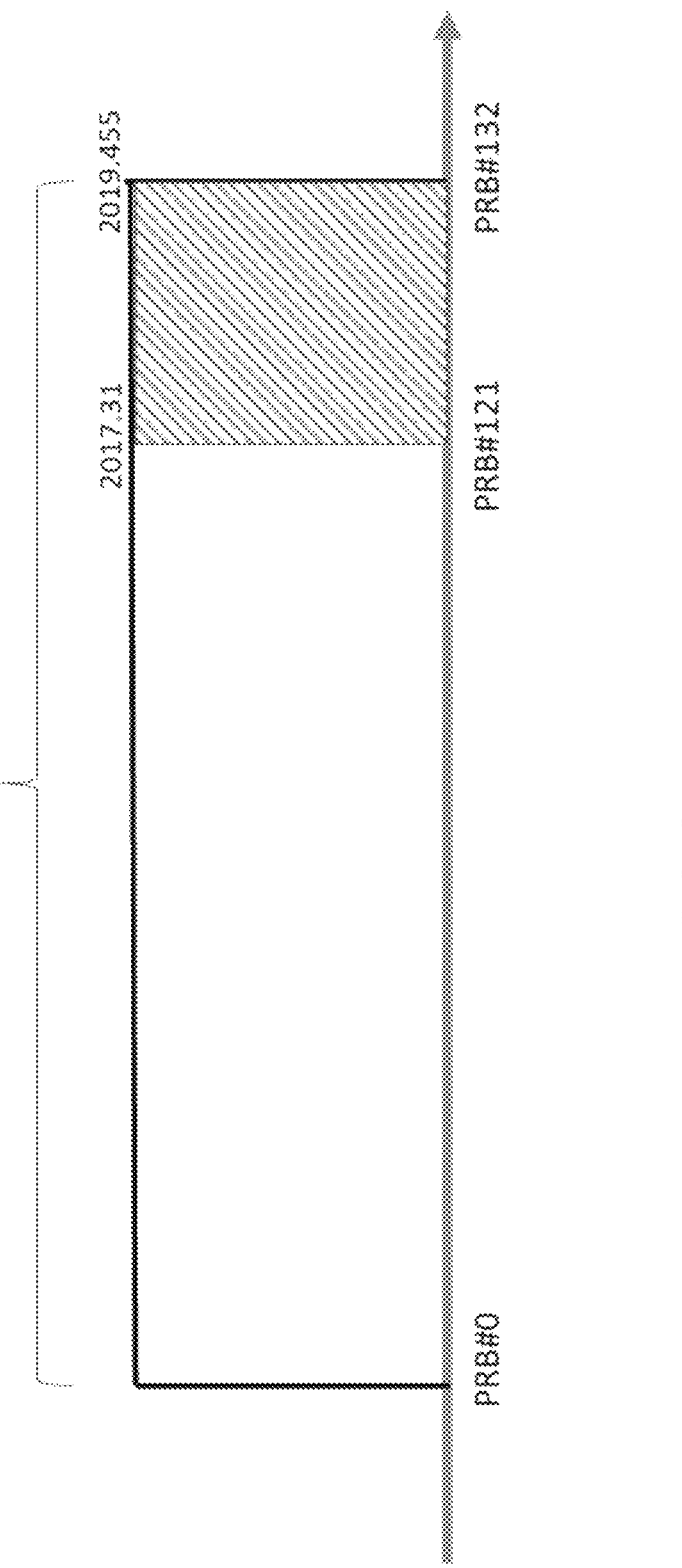
Figures 4A, 4B:
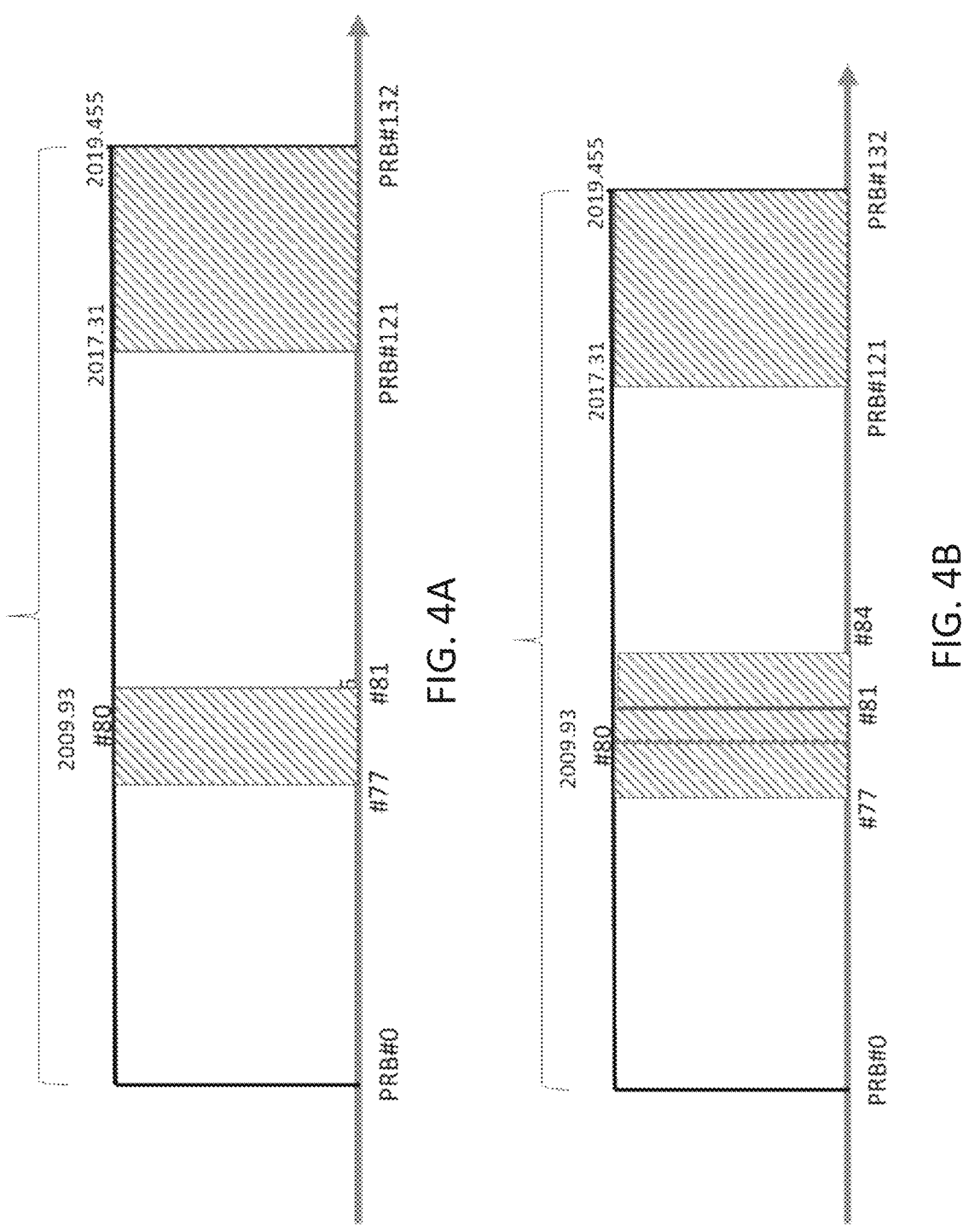
Figures 5A, 5B:
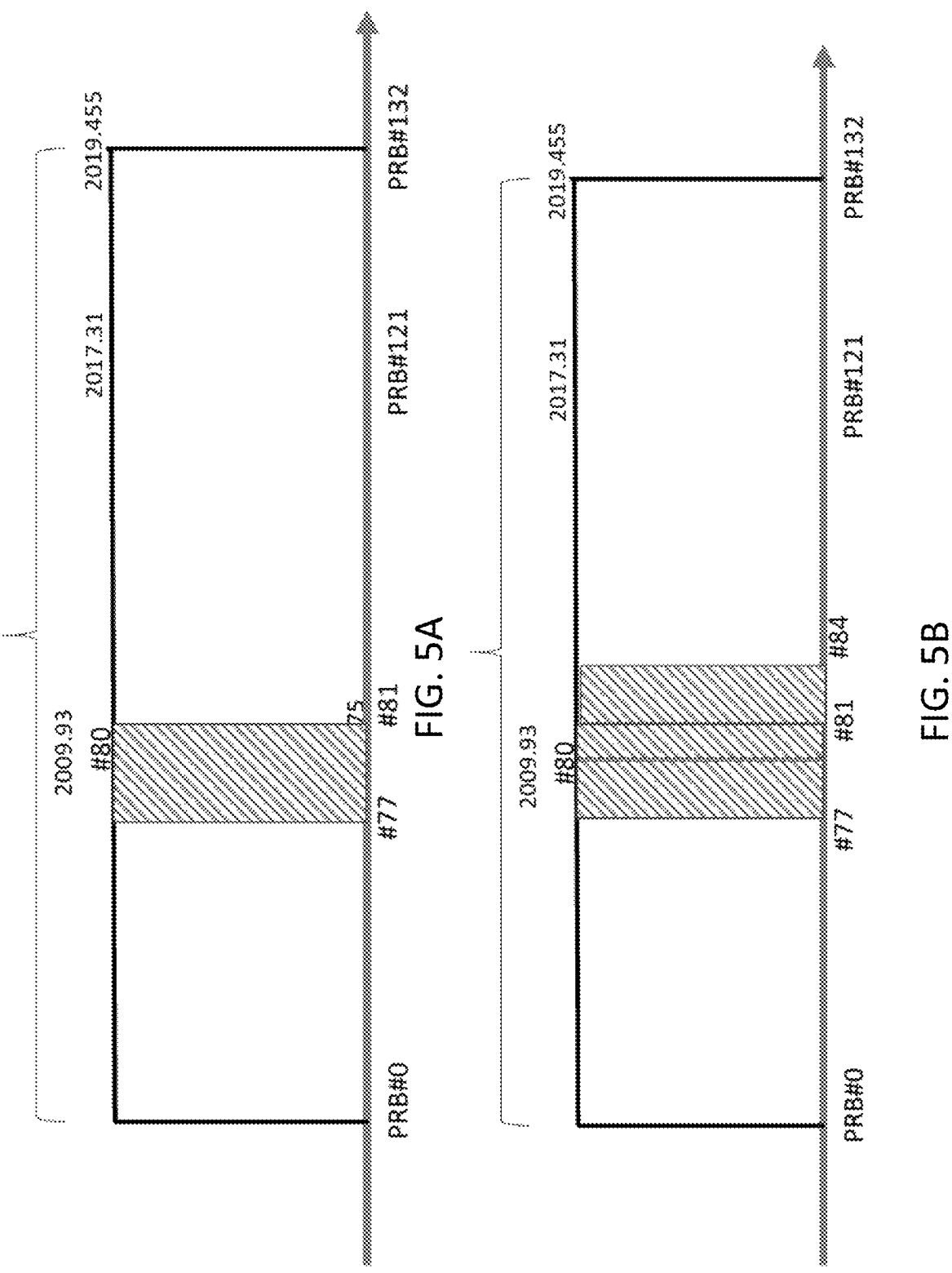
Figures 6A, 6B:
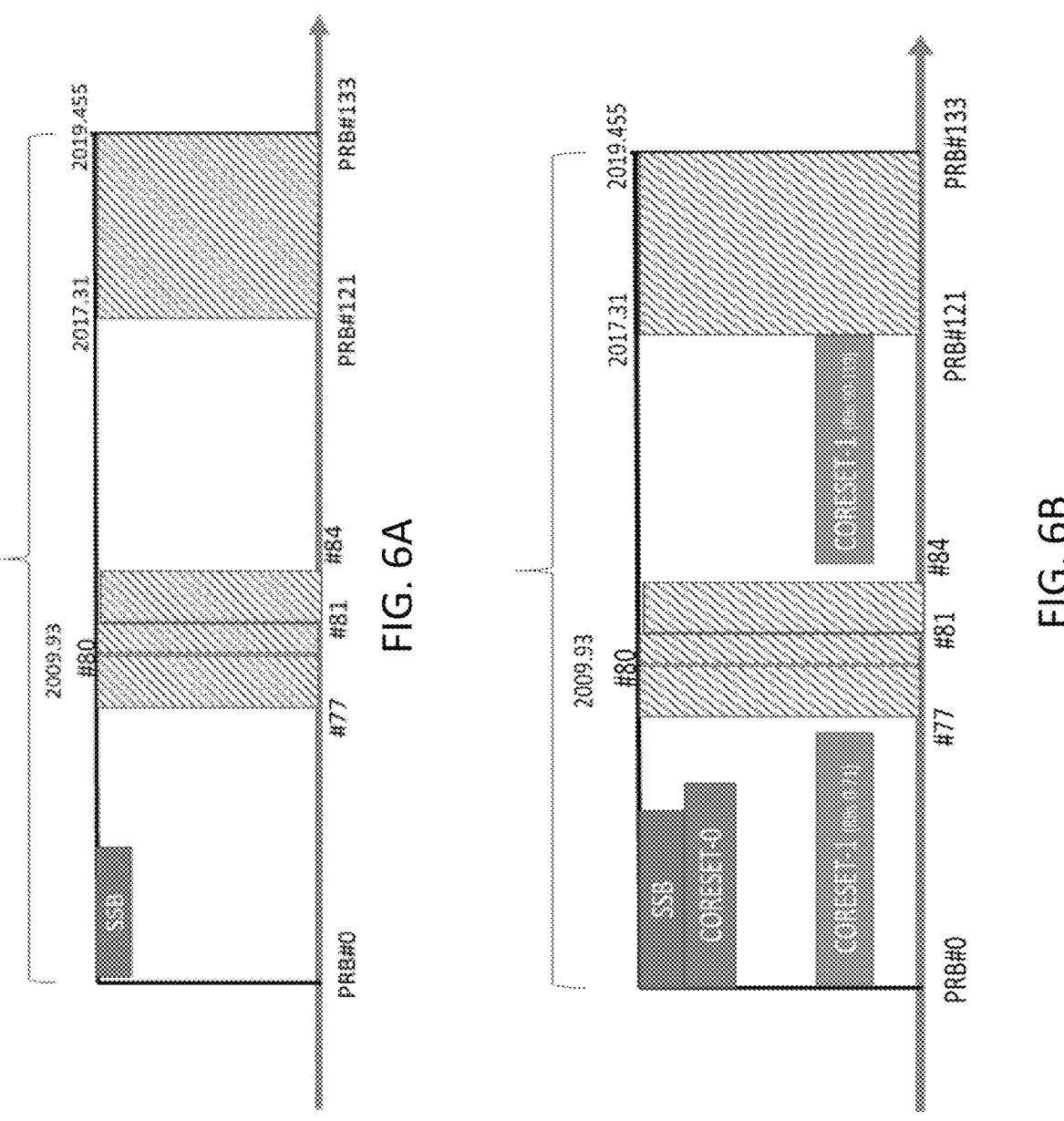
Figures 6C, 6D:
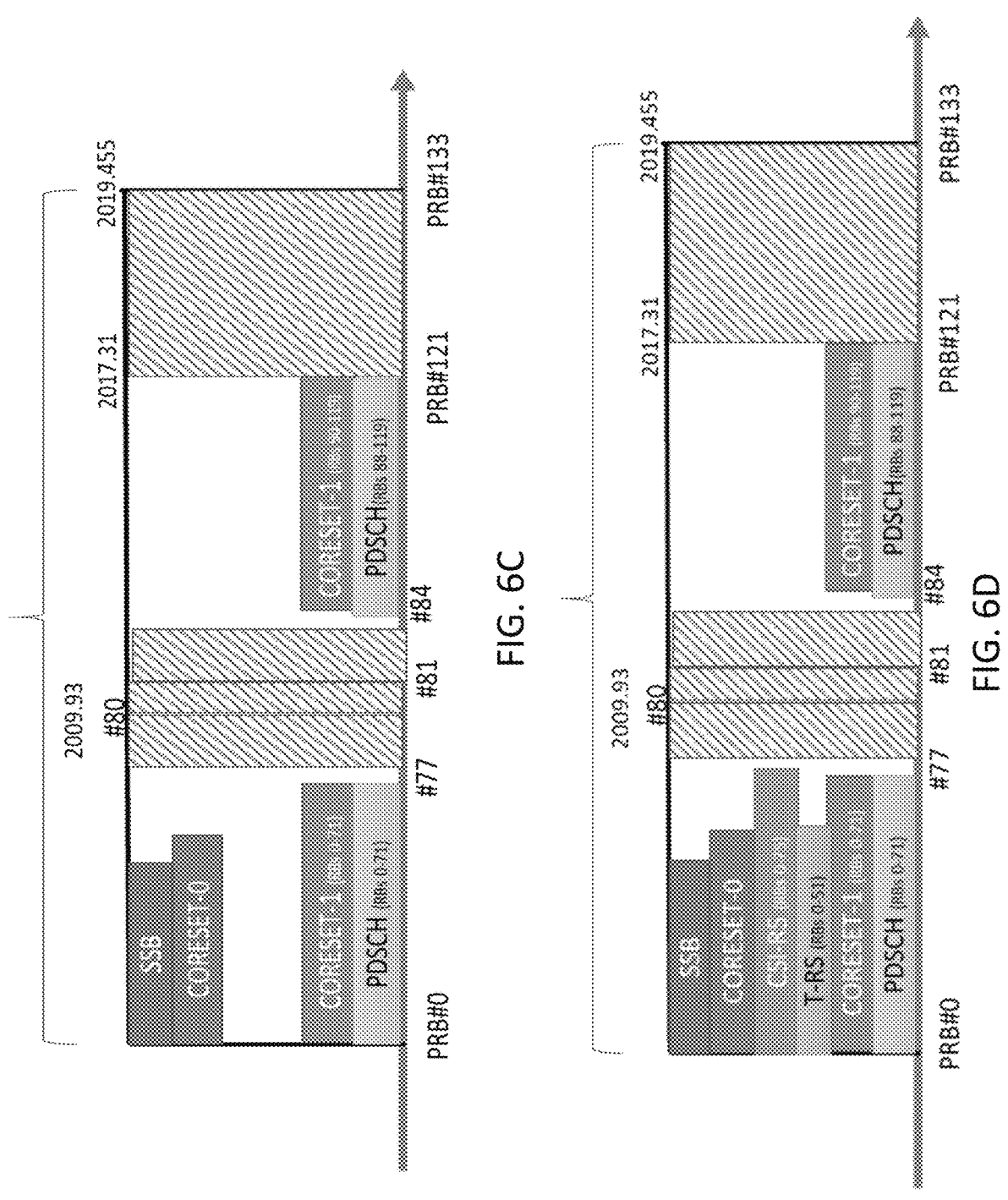
Figure 7:
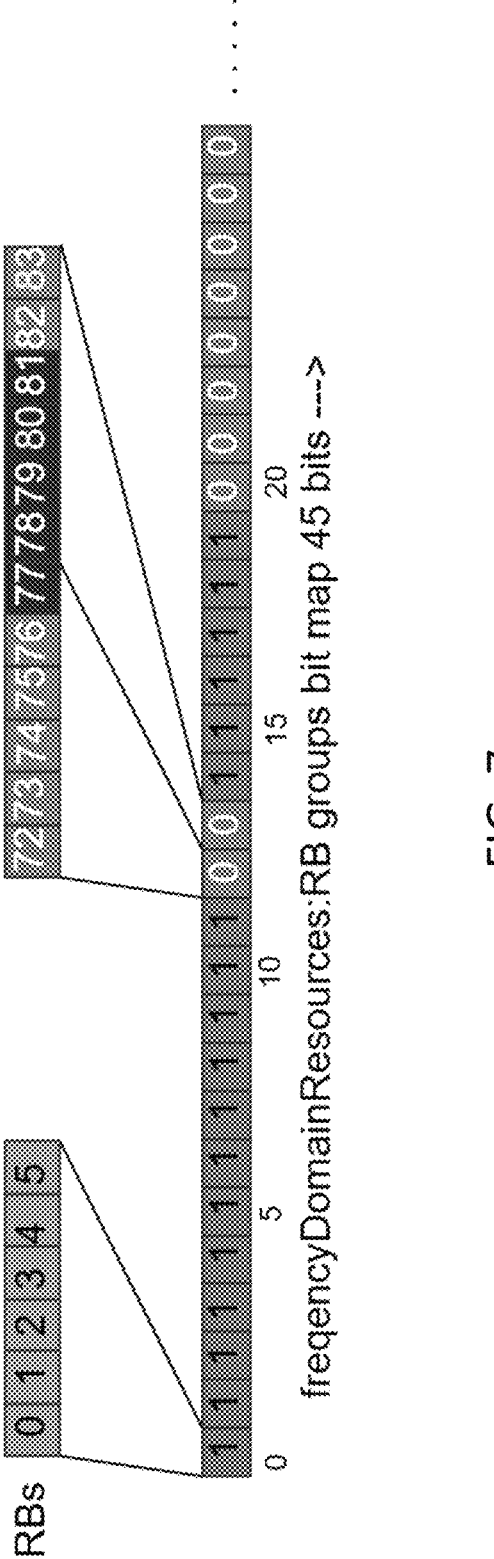
Figure 8:
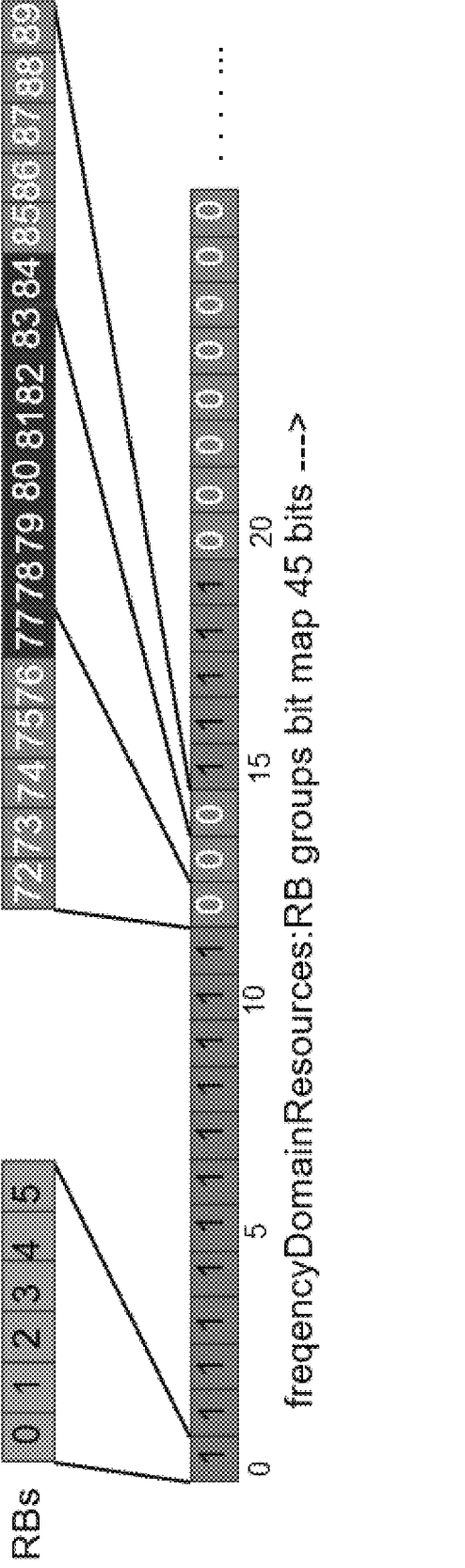
Figures 9A, 9B, 10:
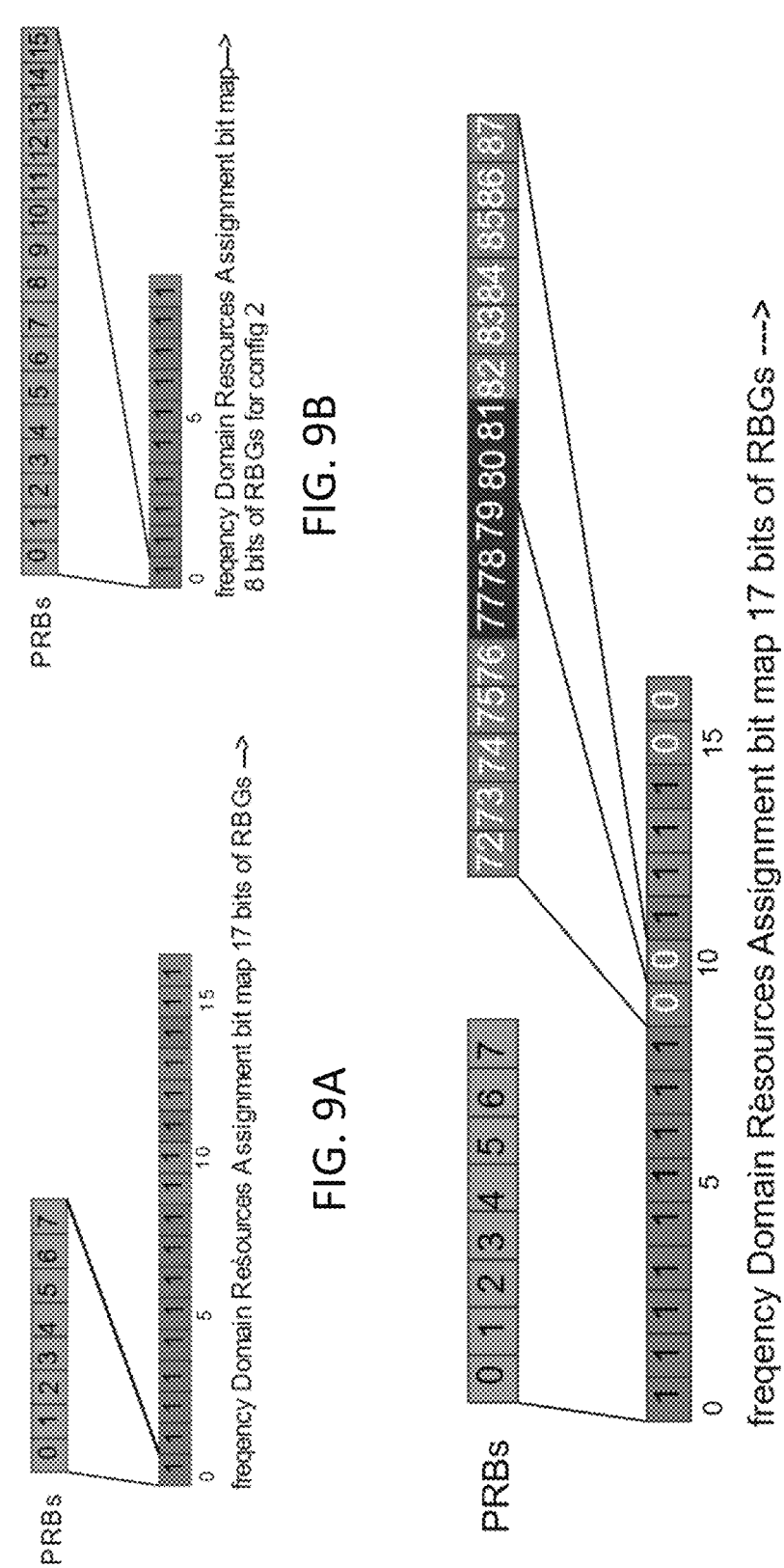

FIG. 1 is a diagram showing multiple exemplary PRB Blanking Configurations;

FIG. 2 is a diagram showing an exemplary PRB Blanking Configuration;

FIG. 3 is a diagram showing an exemplary PRB Blanking Configuration;

FIGS. 4A and 4B show exemplary implementations of PRB Blanking Configurations;

FIGS. 5A and 5B show exemplary implementations of PRB Blanking Configurations;

FIG. 6A shows an exemplary placement of an SSB location in an exemplary implementation of a PRB Blanking Configuration;

FIG. 6B shows an exemplary placement of the SSB, a CORESET-0, and 2 CORESET-1 locations in an exemplary implementation of a PRB Blanking Configuration;

FIG. 6C shows an exemplary placement of the SSB, a CORESET-0, and 2 CORESET-1 locations, and 2PDSCH locations in an exemplary implementation of a PRB Blanking Configuration;

FIG. 6D shows an exemplary placement of the SSB, a CORESET-0, and 2 CORESET-1 locations, 2PDSCH locations, CSI-RS and a T-RS location in an exemplary implementation of a PRB Blanking Configuration;

FIG. 7 shows a CORESET frequency domain resources bitmap assignment;

FIG. 8 shows a CORESET frequency domain resources bitmap assignment;

FIG. 9A shows a Config 1 frequency domain resources bitmap assignment;

FIG. 9B shows a Config 2 frequency domain resources assignment;

FIG. 10 shows a Config 1 frequency domain resources assignment.

DETAILED DESCRIPTION OF THE EMBODIMENTS

Reference is made to Third Generation Partnership Project (3GPP) and the Internet Engineering Task Force (IETF) in accordance with embodiments of the present disclosure. The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards), technical reports (TR) and other papers are incorporated by reference in their entirety hereby, define the related terms and architecture reference models that follow.

3GPP TS 38.211 v 17.2.0, 2022 Jun. 23
3GPP TS 38.213 v 17.2.0, 2022 Jun. 3
3GPP TS 38.214 v17.2.0, 2022 Jun. 23
3GPP TS 38.331 v 17.1.0, 2022 Jul. 9

Abbreviations
IQ—In-phase and Quadrature
DBFS—Decibels relative to full scale
IMT—International Mobile Telecommunications
SEM—Spectrum Emission Mask
RBG—Resource Block Group
CCE—Control Channel Elements
FCC—Federal Communications Commission
USA—United States of America
Non-GBR—Non-Guaranteed Bit Rate
GBR—Guaranteed Bit Rate
Msg2—Message 2
OFDM—Orthogonal Frequency-Division Multiplexing
RAR—Random Access Response
LCG—Logical Channel Group
SIB—System Information Blocks
RU—Radio Unit
W—Watts
CSI—Channel State Information
B5G—Beyond $5^{th}$ Generation
KPI—Key Performance Indicator
SR—Scheduling Request
BSR—Buffer Status Report
PHR—Power Headroom Report
UL—Uplink
DL—Downlink
UE—User Equipment
PDCCH—Physical Downlink Control Channel
PUCCH—Physical Uplink Control Channel
eNB—Evolved NodeB
MAC—Medium Access Control
MCS—Modulation and Coding Scheme
TPC—Transmit Power Control
HARQ—Hybrid Automatic Repeat Request
TTI—Transmit Time Interval
CU—Centralized Unit
DU—Distributed Unit
IP—Internet Protocol
SSB—Synchronization Signal/PBCH block
SFN—System Frame Number
PUSCH—Physical Uplink Shared Channel
DCI—Downlink Control Information
SF—Subframe Number
LTE—Long Time Evolution
NR—New Radio
NZP—Non-Zero Power
ACK—Acknowledgement
NACK—Negative Acknowledgement
LCID—Logical Channel Identifier
RV—Redundancy Version
CRC—Cyclic Redundancy Check
BWP—Bandwidth Part
CBG—Code Block Groups TB—Transport Block
gNB—Next generation nodeB
OLRC—Outer Loop Rate Control
PRB—Physical Resource Block
L3—Layer-3
App—Application
QoE—Quality of Experience
RTT—Round Trip Time
PDU—Protocol Data Unit
BO—Buffer Occupancy
RI—Rank Indicator
BLER—Block Error Rate
SINR—Signal to Interference and Noise Ratio
DCI—Downlink Control Information
PDSCH—Physical Downlink Shared Channel
2Rx—Two Receiver Antennas
4Rx—Four Receiver Antennas
2Tx—Two Transmit Antennas
4Tx—Four Transmit Antennas
2T2R—Two Transmit Two Receive Antennas
4T4R—Four Transmit Four Receive Antennas
MIMO—Multiple Input Multiple Output
CQI—Channel Quality Indicator
QAM—Quadrature Amplitude Modulation
QPSK—Quadrature Phase Shift Keying
iMcs=ith Modulation and Coding Scheme
iTbs=ith Transport Block Size
IIR—Infinite Impulse Response
CW—Codeword
TD—Transmit Diversity
CRNTI—Cell Radio Network Temporary Identifier
ID—Identifier
CSI-RS—Channel Status Information Reference Signal
CSI-IM—Channel Status Information Interference Measurement Reference Signal
T-RS—Tracking Reference Signal
CORESET—Control Resource Set
RAT0—Resource Allocation Type 0
RAT1—Resource Allocation Type 1
RBG—Resource Block Group
EPRE—Energy Per Resource Element
DMRS—Demodulation Reference Signal
RRC—Radio Resource Control
PMI—Precoding Matrix Indicator
3GPP—3rd Generation Partnership Project The present disclosure provides embodiments of systems, devices and methods for Radio Access Networks and Cloud Radio Access Networks.

Implementations described herein provide a number of technical solutions for DL carrier bandwidth PRB blanking.

Implementations as described herein are not limited to any specific shared spectrum like 5G n70 band or the specific IMT technologies like 4G/LTE or 5G; implementations as described herein can be used for any future beyond-5G IMT systems.

In the shared spectrum the muting or blanking zones can be in any number (one or more) and anywhere in a Downlink (DL) carrier bandwidth.

FIG. 1 is a diagram showing multiple exemplary PRB Blanking Configurations. As shown in FIG. 1, multiple PRB Blanking Configurations are possible:

PRB Blanking Configuration 1: Blanking resources in one edge of the band.
PRB Blanking Configuration 2: Blanking resources in the middle and edge of the band.
PRB Blanking Configuration 3: Blanking resources in the middle of the band.

In the case of DL in all these PRB Blanking Configurations, the gNB does not transmit any Control and Data signals in the blanked PRBs.

For these PRB Blanking Configurations, a Base Unit server is provided with the information for protection zone(s), such as blanking frequency (start and stop positions), list of sites and sectors to be fully blanked or partially blanked, and time(s) of day information.

As shown in FIG. 2, depending upon the radio emission characteristics, one or more PRBs are added either in one or both edges of protection zone to meet regulatory requirements.

In addition to protection zone(s) in some cases, there may be additional resources left unused due to limitation of radio access technologies used such as LTE or NR. A few example PRB Blanking Configurations are given for the n70 band where multiple protection zones are required: 2017.31 MHz to 2019.455 and 2009.39 MHz to 2010.275.

TABLE 1

| n70 Band (in MHz) | |
| --- | --- |
| DL | UL |
| 1995-2020(25 MHz) | 1695-1710 (15 MHz) |
| 1995-2020 (25 MHz) | 1700-1710(10 MHz) |

In the present disclosure, the N70 band is taken as an example to explain the general PRB blanking solution described in this disclosure, but the band/frequency can be any 5G or BSG supported band.

In an implementation, a DL Scheduler can be configured to use Resource Allocation Type0 (RAT0). A bitmap-based resource allocation can be indicated to the UE with a granularity of one or more Resource Block Groups (RBG). The DL scheduler can be configured to employ an RBG bitmap for RAT0. Using the RAT0, the DL scheduler can be configured to selectively not use some of the RBG and mitigate the interference.

In another implementation, the DL Scheduler can also be configured with a Dynamic Switch between Resource Allocation Type1 (RAT1) and RAT0. In RAT1, UE is given an indication of resource allocation in terms of a starting RB and length of frequency resources RBs. In each TTI based on the selected user's priority, the UEs will be dynamically scheduled using RAType0 or RAType1 based on their PRB requirements. The DL Scheduler is configured to dynamically schedule RAType0 or RAType1 at an optimal point where there is no PRB wastage in that TTI. The Dynamic Switch is configured so that the in the same UE, in one TTI RAType0 can be used and in another TTI RAType1 can be used.

Disclosed are scheduler-based solutions using RAT0 for a 5G NR technology. Embodiments are described using examples implemented in 5G NR based Technology, however the solutions described herein can be employed in any IMT technology.

In implementations described herein, the PRB blanking can be fully transparent to the UE. The UE can start normal operation with a cell, where only the first RRC Reconfiguration UE is configured with a RAT0 based allocation.

Different PRB Blanking Configurations and RBG Mapping

As described above, in PRB Blanking Configuration 1, blanking is employed at an edge of the carrier bandwidth at an upper end of the carrier bandwidth. As shown in FIG. 3, an example of blanking of the upper edge of carrier bandwidth includes a blanking region of PRB #121 to PRB #132.

FIGS. 4A and 4B show exemplary implementations of PRB Blanking Configuration 2, PRB Blanking Configuration 2A and PRB Blanking Configuration 2B respectively, where blanking resources are employed in the middle and edge of the band. FIGS. 5A and 5B show an example of an exemplary implementations of PRB Blanking Configuration 3, PRB Blanking Configuration 3A and PRB Blanking Configuration 3B respectively, where blanking resources are employed in the middle of the band.

As shown in FIGS. 4A and 5A, the same exemplary blanking range, PRB #77 to #81, is employed in the middle of the band in PRB Blanking Configuration 2A and PRB Blanking Configuration 3A.

As shown in FIGS. 4B and 5B, the same exemplary blanking range, PRB #77 to #84, is employed in the middle of the band in PRB Blanking Configuration 2B and PRB Blanking Configuration 3B.

As shown in FIG. 3, in PRB Blanking Configuration 1, in a band where the PRB starts at #0 and ends at #132, a PRB Blanking region is from PRB #121 to #132. In PRB #0 to #120, the RBGs can be used for data scheduling. In the PRB #121 to #132 blanking range, the RBGs cannot be used for data scheduling. In the band are 16.625 RBGs (133 PRB/8). There are 5 PRBs in the last RBG (0.625*8). The special zone for PRB blanking starts at the 121st PRB. The logical flow for the exemplary PRB Blanking Configuration 1 in FIG. 3 is as follows:

1) Start RBG for Blanking=FLOOR ((Start PRB of the special zone)/RBG size)=(121)/8=FLOOR (15.125RBG). Accordingly, the $15^{th}$ RBG (RBG #15) is overlapping with the special zone.
2) Number of PRBs in special zone=(End PRB of the special zone–Start PRB of the special zone)+1=(132–121)+1=12PRBs.
3) Start PRB in the special zone overlapping RBG= (15.125RBGs–FLOOR (15.125))*RBG Size=0.125*RBG Size=FLOOR (0.125*8)=1PRB.
4) Number of PRBs in special zone overlapping RBG= (RBG size–Start PRB in the special zone overlapping RBG)=(8–1)=7PRBs
5) Number of PRBs required from next RBG=(Number of PRBs in special zone–Number of PRBs in the special zone overlapping RBG)=(12PRBs–7PRBs)=5PRBs.

In the exemplary PRB Blanking Configuration 1, two RBGs are blanked, the $15^{th}$ (PRB #120 to PRB #127) and $16^{th}$ (PRB #128 to PRB #132) RBGs. As such PRB wastage due to the blanking region to RBG domain mapping is equal to 1PRB from RBG #15.

As shown in FIG. 4A, in a band where the PRB starts at #0 and ends at #132, a first exemplary blanking range PRB #77 to #81 is employed in the middle of the band in PRB Blanking Configuration 2A. (As noted above, the same RGB blanking is employed for the middle blanking range in PRB Blanking Configuration 3A in FIG. 5A). As shown in FIG. 4A, a second exemplary blanking range PRB #121 to #132 is employed in the end of the band in PRB Blanking Configuration 2A. In PRB #0 to #76, the RBGs can be used for data scheduling. In the PRB #77 to #81 blanking range, the RBGs cannot be used for data scheduling. At PRB 80 to 120, the RBGs can be used for data scheduling. In the PRB #121 to #132 blanking range, the RBGs are potentially not used for data scheduling. In the band are 16.625 RBGs (133 PRB/8). There are SPRBs in the last RBG (0.625*8). The special zone for PRB blanking starts at the $77^{th}$ PRB. The logical flow for the exemplary PRB Blanking Configuration 2A in FIG. 4A is as follows:

1) Start RBG for Blanking=FLOOR ((Start PRB of the special zone)/RBG size)=(77)/8=FLOOR (9.625RBG). Accordingly, the $9^{th}$=RBG #9 is overlapping with the special zone.
2) Number of PRBs in special zone=(End PRB of the special zone–Start PRB of the special zone)+1=(81–77)+1=SPRBs.
3) Start PRB in the special zone overlapping RBG= (9.625RBGs–FLOOR (9.625))*RBG Size=0.625*RBG Size=FLOOR (0.625*8)=SPRBs.
4) Number of PRBs in special zone overlapping RBG= (RBG size–Start PRB in the special zone overlapping RBG)=(8–5)=3PRBs.
5) Number of PRBs required from next RBG=(Number of PRBs in special zone–Number of PRBs in the special zone overlapping RBG)=(5PRBs–3PRBs)=2PRBs.

In the exemplary PRB Blanking Configuration 2A, two RBGs are blanked, the $9^{th}$ (PRB #72 to PRB #79) and $10^{th}$ (PRB #80 to PRB #87) RBGs. As such PRB wastage due to the blanking region to RBG domain mapping=5PRBs from RBG #9+6PRBs from RBG #10=11PRBs.

As shown in FIG. 4B, in a band where the PRB starts at #0 and ends at #132, a first exemplary blanking range PRB #77 to #84 is employed in the middle of the band in PRB Blanking Configuration 2B. (As noted above, the same RGB blanking is employed for the middle blanking range in PRB Blanking Configuration 3B in FIG. 5B). As shown in FIG. 4B, a second exemplary blanking range PRB #121 to #132 is employed in the end of the band in PRB Blanking Configuration 2B. In PRB #0 to #76, the RBGs can be used for data scheduling. In the PRB #77 to #84 blanking range, the RBGs cannot be used for data scheduling. At PRB #85 to #120, the RBGs can be used for data scheduling. In the PRB #121 to #132 blanking range, the RBGs are potentially not used for data scheduling. In the band are 16.625 RBGs (133 PRB/8). There are SPRBs in the last RBG (0.625*8). The special zone for PRB blanking starts at the $77^{th}$ PRB. The logical flow for the exemplary PRB Blanking Configuration 2B in FIG. 4B is as follows:

1) Start RBG for Blanking=FLOOR ((Start PRB of the special zone)/RBG size)=(77)/8=FLOOR (9.625 RBG). Accordingly, the $9^{th}$=RBG #9 is overlapping with the special zone.
2) Number of PRBs in special zone=(End PRB of the special zone–Start PRB of the special zone)+1=(84–77)+1=SPRBs.
3) Start PRB in the special zone overlapping RBG=(9.625 RBGs–FLOOR (9.625))*RBG Size=0.625*RBG Size=FLOOR (0.625*8)=SPRBs.
4) Number of PRBs in special zone overlapping RBG= (RBG size–Start PRB in the special zone overlapping RBG)=(8–5)=3PRBs.
5) Number of PRBs required from next RBG=(Number of PRBs in special zone–Number of PRBs in the special zone overlapping RBG)=(8PRBs–3PRBs)=SPRBs.

In the exemplary PRB Blanking Configuration 2B, two RBGs are blanked, the $9^{th}$ (PRB #72 to PRB #79) and $10^{th}$ (PRB #80 to PRB #87) RBGs. As such PRB wastage due to the blanking region to RBG domain mapping=5PRBs from RBG #9+3PRBs from RBG #10=8PRBs.

Handling Downlink Channels and Reference Signals in the Presence of PRB Blanking In an implementation, broadcast messages such as SIBs, and paging messages etc., can use RAT1 based allocation. Resources which are not part of the protected zones form one or multiple frequency chunks. To avoid interference in a protected zone, each of the physical channels and signals of IMT systems such as NR need to be placed in one or more frequency chunks, considering restrictions on placement of these channels and signals have in a normal band. The channels and signals include SSB, PDCCH, PDSCH, CSI-RS and T-RS.

SSB

In an implementation, the SSB can be placed in a frequency chunk when all resources of the SSB (about 20 contiguous RBs) are fully inside the frequency chunk and not overlapping with a protected zone.

FIG. 6A shows a placement of an SSB location in the exemplary implementation of PRB Blanking Configuration 2B. As shown in FIG. 6A, the first exemplary blanking range PRB #77 to #84 is employed in the middle of the band in PRB Blanking Configuration 2B. Accordingly, the SSB can be placed from RB #4 to RB #23.

PDCCH

Coreset #0

The CORESET #0 in NR includes contiguous 24, 48 or 96 RBs. The CORESET #0 is fully contained in one of the frequency chunks. CORESET size is chosen $$N_{RB}^{CORESET} = 48$$

only if one of the frequency chunk BW is >=48. If the frequency chunk BW is not >=48, the CORSET size is configured to be $$N_{RB}^{CORESET} = 24.$$

To place the CORESET #0, the minimum size of frequency chunk can be at least 24 RB wide.

Further, in the NR, the MIB carries the parameters indicating the location and resources for ControlResourceSetZero (CORSET #0) on a resource grid. Also, CORESET #0 is interleaved. As such, out of the 16 resources indicated by index, the CORSET #0 is configured so that of the 4 most significant bits of pdcch-ConfigSIB1 from 3GPP TS 38.213 Table 13-1 for CORESET #0, only the configurations satisfying CORSET #0 constraints above are selected, such as BW in RBs, Number of symbols and an offset.

In another implementation, where the SSB starts from RB #4 to RB #23, the CORESET #0 can start from RB #4 to RB #27. In another implementation, CORESET #0 can start from RB #6 to RB #29 to align with CORESET #1 (discussed below).

In the case of a protection zone from RB #77 to RB #81 (for example, as shown in FIG. 4A for PRB Blanking Configuration 2A), then CORESET #0 can occupy from RB #84 to RB #107. In another implementation, as shown in FIG. 6B for PRB Blanking Configuration 2B, if a protection zone is extended, for example due to radio characteristics, from RB #77 to RB #84 then CORESET #0 can start with RB #90 to RB #113.

Coreset #1

In an implementation, a CORESET #1 is configured to use the full bandwidth available while avoiding the blanked out PRBs with minimum loss of resources. In NR, the RBgroups occupied by CORESET #1 are configured by the frequencyDomainResources bitmap inside ControlResourceSet IE as defined in 3GPP TS 38.331, which is signaled as part of an RRC Setup message. As shown in the example of FIG. 7, The frequencyDomainResources is a bitmap of 45 bits, where each bit indicates a group of 6 RBs is part of the CORESET or not. The grouping starts with 6 RBs in the band. An RB group is indicated to be present, only if none of 6 RBs in the RB group is part of the blanked resources.

In an implementation, referring to FIG. 3 and PRB Blanking Configuration 1, RB #121 and above is blanked. In the implementation, the RB groups #0 (RB #0-RB5), RB groups #19 (RB #114-RB #119) are part of CORESET #1. The freqencyDomainResources bitmap's first 20 RB groups are enabled while rest is disabled.

TABLE 1

| ControlResourceSet IE | |
| --- | --- |
| freqency DomainResources | 11111111111111111111000 . . . |

In another example, referring to FIG. 4A and PRB Blanking Configuration 2A, RB #77-RB #81 is blanked as well as RB #121 and above. FIG. 7 shows an example the mapping of RB groups for the frequencyDomainResources bitmap. The RB groups #0 (RB #0-RB5), RB group #11 (RB #66-RB #71) and RB groups #14 (RB #84-RB-89), RB groups #19 (RB #114-RB #119) are part of CORESET #1. RB groups #20, #21 and above are also blanked. RB groups #12, #13 and #20, #21 are excluded. Since RB #72-RB #76 are part of RB group #12, which also contain blanked RB #77, these RBs are excluded from CORESET resources. In RB group #13, RB #82 and RB #83 are excluded due to RBs #78-RBs #81. In the freqencyDomainResources bitmap, bits corresponding to barred RB groups are set to zero. In addition, so are RB groups that are not fully inside the bandwidth. As shown in FIG. 7, RB groups #22 and above are also excluded.

FIG. 6B shows an illustration of the of the above-described SSB, CORESET-0, and the 2 CORESET-1 locations in the implementation for PRB Blanking Configuration 2B, with PRB blanking protection zones from RB #77 to RB #84 and RB #121 and above. FIG. 8 shows an example the mapping of RB groups in a CORESET for the frequencyDomainResources bitmap for PRB Blanking Configuration 2B as shown in FIG. 6B, where PRB #77-PRB-#84 are blanked as well as PRB #121 and above. The PRB groups #0 (PRB #0-PRB5), PRB group #11 (PRB #66-PRB #71) and PRB groups #15 (PRB #90-PRB-95), PRB groups #19 (PRB #114-PRB #119) are part of CORESET #1. PRB group #12, 13, 14 is blanked, as well as PRB group #20 and #21 and above.

Search Space Configuration

In an implementation, as the number of usable CCEs are less in n70 band 25 MHz carried bandwidth, the dimensioning of the search space can be calculated based on the available CCEs after PRB blanking and other CORESET #1 related configurations, for example, as described above.

In an implementation, where the N70 25 MHz band is without PRB blanking, the Search Space is configured as follows:

frequencyDomainResources   '11111111   11111111
       11111100 00000000 00000000 00000'B
       Available CCEs=22
       Different aggregation Levels (1/2/4/8/16) in the nrofCandidates of the searchSpaceId IE can be dimensioned based on the available CCEs.

In an implementation, where the N70 25 MHz band has PRB blanking, the Search Space is configured as follows:

PRB Blanking Configuration 1 frequencyDomainResources   '11111111     11111111
111xxx00 00000000 00000000 00000'B
    Available CCEs=22−3=19
    Different aggregation Levels (1/2/4/8/16) in the
       nrofCandidates of the searchSpaceId IE should be
       dimensioned based on the available CCEs.
PRB Blanking Configuration 2A
frequencyDomainResources   '11111111     111xx111
111xxx00 00000000 00000000 00000'B
    Available CCEs=22−5=17
    Different aggregation Levels (1/2/4/8/16) in the
       nrofCandidates of the searchSpaceId IE should be
       dimensioned based on the available CCEs.
  PRB Blanking Configuration #2B
frequencyDomainResources   '11111111     111xxx11
111xxx00 00000000 00000000 00000'B
    Available CCEs=22−6=16
    Different aggregation Levels (1/2/4/8/16) in the
       nrofCandidates of the searchSpaceId IE should be
       dimensioned based on the available CCEs.
PRB Blanking Configuration 3A
frequencyDomainResources   '11111111     111xx111
11111100 00000000 00000000 00000'B
    Available CCEs=22−2=20
    Different aggregation Levels (1/2/4/8/16) in the
       nrofCandidates of the searchSpaceId IE should be
       dimensioned based on the available CCEs.
PRB Blanking Configuration 3B
frequencyDomainResources   '11111111     111xxx11
11111100 00000000 00000000 00000'B
    Available CCEs=22−3=19
    Different aggregation Levels (1/2/4/8/16) in the
       nrofCandidates of the searchSpaceId IE should be
       dimensioned based on the available CCEs.
Example Search Space Configuration The following example of a search space configuration is shown as an example to handle the three exemplary PRB blanking PRB Blanking Configurations described herein.

```
[1] searchSpaceId 2
nrofCandidates
{
aggregationLevel1 n4,
aggregationLevel2 n2,
aggregationLevel4 n2,
aggregationLevel8 n2,
aggregationLevel16 n0
}
[2] searchSpaceId 3
nrofCandidates
{
aggregationLevel1 n4,
aggregationLevel2 n2,
aggregationLevel4 n2,
aggregationLevel8 n1,
aggregationLevel16 n0
},
```

PDSCH

In implementations, a PDSCH is configured to utilize the full bandwidth available, while avoiding the blanked out PRBs, with minimum loss of resources. At the same time, the system is configured to minimize the maximum UE throughput reduction to avoid blanked out PRBs.

RAT0 is chosen for PDSCH with a single BWP. The BWP size can be as high as the full bandwidth of the system. The resources allocated to a UE is indicated by frequency domain resource assignment field inside DCI format 1_1, which is a bitmap of size $N_{RBG}$. Each bit in the bitmap represents a group of RBs called RBGs.

In one example for a bandwidth of 25 MHz DL carrier, there are 133 PRBs in the band, and the NR allows two RBG sizes available 8 and 16 with configuration 1 (Config 1) and configuration 2 (Config 2) respectively, as given at table 5.1.2.2,1-1 in 3GPP TS 38.214. FIG. 9A shows a Config 1 and FIG. 9B shows a Config 2 for 25 MHz (133 RBs). In an implementation, RBG size is given by RAT config1 to minimize unused resources. As will be appreciated, choosing config2 instead of config 1 in the case of 25 MHz BW each RBG blanked out results in 16 unusable RBs instead of 8 with config 1. Config1 for RBG size can be signaled by PDSCH-CONFIG IE defined in 3GPP TS 38.331.

For all dedicated messages scheduled in DCCH, the DU can be configured to use UE DCI1_1 where the bits corresponding to blanked out RBGs are '0'. Table 2, shows an example for PRB Blanking Configuration 1 with a 25 MHZ DL band.

TABLE 2

| DCI 1_1 | |
| --- | --- |
| Frequency domain resource assignment | $b_0 b_1 b_2 b_3 b_4 b_5 b_6 b_7 b_8 b_9 b_{10} b_{11} b_{12} b_{13} b_{14} 00$ |

In another example, as shown in Table 3, with PRB Blanking Configuration 2 one UE is given the full bandwidth. As shown in FIG. 6C, in PRB Blanking Configuration 2B PRB #77-PRB-#84 and PRB #121 and above are blanked. The RBGs can be scheduled in the respective bandwidth parts RGB #0 (PRB #0-PRB #7), RBG #8 (PRB #64-PRB #71) and RBGs #11 (PRB #88-PRB-#95), RBGs #14 (PRB #112-PRB #120). As shown in FIG. 10 and Table 3, where RBGs #9, #10 and #15, #16 are blanked out, the corresponding bits in the bitmap {9, 10, 15 and 16} are set to zero. Allocation to UE is 104 PRB instead of a maximum possible 133 RBs without blanking.

TABLE 3

| DCI 1_1 | |
| --- | --- |
| Frequency domain resource assignment | 1111111100111100 |

In the example, to blank out 5 PRBs, i.e., PRBs #77 to #81, the scheduler is configured to leave 16 PRBs: PRB #72 to PRB #88.

Broadcast Messages, RAT1 Allocation

All the broadcast messages from the cell like SIB1, SI messages and paging messages are scheduled with DCI 1_0 in CORESET #0, which is configured to allow only the RAT1. The gNB scheduler is configured to allocate resources for these messages to avoid blanked out resources. The scheduler is configured to operate in mixed mode, so simultaneous RAT0 and RAT1 allocations can be employed for different UEs.

Reference Signal Design

CSI-RS

CSI-RS is used by UE for different purposes, including CSI, Interference and RRM measurements. Multiple configurations of CSI-RS are available. The system is configured so that:

1. One CSI-RS configuration can cover the biggest frequency chunk.
    2. Minimum bandwidth of NZP-CSI-RS min(BWP size, 24), which is 24 (As per 3GPP TS 38.214 section 5.2.2.3.1 NZP CSI-RS). CSI-RS can be placed in a frequency chunk bigger than 24RB.

3. Only one periodic CSI-RS resource is set (as per 3GPP TS 38.214)

a. All CSI-RS resources within one set are configured with same density and same nrofPorts.

b. CSI-RS resources of a resource set are configured with the same starting RB and number of RBs and the same cdm-type.

In the NR, the CSI-RS frequency resource is configured by freqBand of type CSI-Frequency Occupation within the IE signaled in RRC reconfiguration (defined in 3GPP TS 38.331). An additional constraint on startingRB and nrof-RBs is that both must be multiples of 4.

In one implementation, as shown in Table 4, a configuration for CSI-RS for PRB Blanking Configuration 1, where PRB #121 and above muted, the CSI-RS starting RB=0 and nrofRBs=120

TABLE 4

| CSIFrequencyOccupation IE | |
|---|---|
| startingRB | 0 |
| nrofRBs | 120 |

In the implementation, CSI-RS=120PRBs (PRB #0 to PRB #119, in multiples of 4PRBs) can be placed in non-blocked zone from PRB #0 to PRB #120=121PRB size. SIB1 configured Initial-BWP=133PRBs.

In another implementation, for PRB Blanking Configuration 2, as shown in Table 5, a protected resource starts at RB #77 where a new CSI-RS configuration with the following values are signaled to UE as part of a RRC reconfiguration.

TABLE 5

| CSIFrequencyOccupation IE | |
|---|---|
| startingRB | 0 |
| nrofRBs | 76 |

In the implementation, CSI-RS=76PRBs (PRB #0 to PRB #75) are placed in multiples of 4PRBs in non-blocked zone from PRB #0 to PRB #76=77PRB in size. SIB1 is configured at an Initial-BWP=133RBs.

T-RS

T-RS is a type of NZP-CSI-RS used by UE for synchronization. The system's T-RS in such a way that:

1. One T-RS configuration can cover the biggest frequency chunk.

2. Minimum bandwidth of T-RS min(BWP size, 52), which is 52.

3. The NZP-CSI-RS frequency resource is configured by freqBand of type CS/—Frequency Occupation in RRC reconfiguration message thus having the constraint on startingRB and nrofRBs, both have to be multiple of 4.

In an exemplary implementation for PRB Blanking Configuration 1. where PRB #121 and above are blanked, the T-RS can be configured as shown in Table 6.

TABLE 6

| CSIFrequencyOccupation IE | |
|---|---|
| startingRB | 0 |
| nrofRBs | 52 |

In the implementation, T-RS=52PRBs (PRB #0 to PRB #51) can be placed in non-blocked zone from PRB #0 to PRB #120=121PRB size. The SIB1 is configured at an Initial-BWP=133PRBs.

FIG. 6D shows the CSI-RS and T-RS resource allocation for PRB Blanking Configuration 2B. In the implementation, a new T-RS configuration with the following values are to signaled to UE as part of a RRC reconfiguration.

TABLE 7

| CSIFrequencyOccupation IE | |
|---|---|
| startingRB | 0 |
| nrofRBs | 52 |

In the implementation, T-RS=52PRBs (PRB #0 to PRB #51) can be placed in non-blocked zone from PRB #0 to PRB #76=77PRB size. The SIB1 is configured at an Initial-BWP=133RBs.

In implementations, the system can be configured to optimize unused PRBs.

SS Block Placement Optimization

Due to DL PRB blanking and mapping to the RBG domain, the carrier bandwidth has unused PRBs. Further, the SSB 20PRBs placed in the lower edge of the bandwidth and mapping thereof to the RBG domain also creates unused PRBs. If the system does not have control over SSB placement, the unused PRBs are placed proximate to the PRB blanking. Accordingly, disclosed are implementations of an optimization technique to place the SSB to overlap with unused PRBs created by DL PRB blanking. In the implementations, the SSB is placed so that the total unused PRBs are less than when the SSB is placed in lower edge of the bandwidth.

For PRB Blanking Configuration 1, the SSB placement is placed in the lower edge of the BW, consistent with conventional configurations of a 5G system.

For PRB Blanking Configuration 2 and PRB Blanking Configuration 3, the SSB placement can be placed in different parts of the BW, for example, other than in the lower edge of the BW.

In the following disclosure, PRB Blanking Configuration 2 and PRB Blanking Configuration 3 are again described in implementations including the blanking patterns common to the two PRB Blanking Configurations.

PRB Blanking Configuration 2A and PRB Blanking Configuration 3A

As described herein, the same exemplary blanking range, PRB #77 to PRB #81, is employed in the middle of the band in PRB Blanking Configuration 2A and PRB Blanking Configuration 3A (for PRB blanking region 1=PRB #77 to #81 (PRB starts from 0)). In these blanking patterns, the system can be configured for optimal SSB placement as follows:

The SSB is placed from SSB Start="SSB to Point A (number of RBs in terms of SCS 15 kHz)–Left side"+kssb;

SSB starts from PRB #84 and ends in PRB #103. The SSB occupies RBG #10, RBG #11 and RBG #12 (total three RBGs used).

The PRBs unused due to the SSB placement=2 PRBs (PRB #82/#83 unused, #80/#81 are blanked) in RBG #10=2PRBs.

TABLE 8

| ARFCN of valid SSB | SSB Center Frequency (MHz) | SB to Point A (number of RBs in terms of SCS 15 kHz) - Left side | SB end PRB - Right side | kssb (number of subcarriers of subcarrierSpacing) (should be an integer between 0 to 23 | SSB left edge to Point A distance (kHz) | M |
|---|---|---|---|---|---|---|
| 402490 | 2012.45 | 84 | 103 | 4.77485e−12 (0) | 15120 | M = 1 |

TABLE 9

| Carrier center frequency (MHz) | Carrier Bandwidth (RBs) | subcarrierSpacing (kHz) |
|---|---|---|
| 2007.5 | 133 | 15 |

| ARFCN of PointA | Frequency (MHz) |
|---|---|
| 399106 | 1995.53 |

PRB Blanking Configuration 2B/3B

As shown in FIGS. 4B and 5B, the same exemplary blanking range, PRB #77 to #84, is employed in the middle of the band in PRB Blanking Configuration 2B and PRB Blanking Configuration 3B. (PRB Blanking region #1=PRB #77 to #84 (PRB starts from 0)). In this blanking pattern, the system can be configured for optimal SSB placement as follows.

SSB Start="SSB to Point $A$ (number of RBs in terms of SCS 15 kHz)–Left side"+$kssb$;

The SSB starts from PRB #90 and ends in PRB #110 The SSB occupies RBG #11, RBG #12, and RBG #13.

There are 6 unused PRBs due to the SSB placement (3 PRBs (PRB #85/86/87 unused, #80/81/82/83/84 blanked) in RBG #10 plus 2 PRBs (PRB #88/89) in RBG #11 plus 1 PRB (PRB #111) in RBG #13=6PRBs).

TABLE 10

| ARFCN of valid SSB | SSB Center Frequency (MHz) | SB to Point A (number of RBs in terms of SCS 15 kHz) - Left side | SB end PRB - Right side | kssb (number of subcarriers of subcarrierSpacing) (should be an integer between 0 to 23) | SSB left edge to Point A distance (kHz) | M |
|---|---|---|---|---|---|---|
| 402730 | 2013.65 | 90 | 110 | 8 | 16320 | M = 1 |

TABLE 11

| Carrier center frequency (MHZ) | Carrier Bandwidth (RBs) | subcarrierSpacing (kHz) |
|---|---|---|
| 2007.5 | 133 | 15 |

TABLE 12

| ARFCN of PointA | Frequency (MHz) |
| --- | --- |
| 399106 | 1995.53 |

Alternate Solution: PRB Blanking Configuration 2B/3B with SSB Placement in the Lower Edge of the Bandwidth As described herein, an implementation of PRB Blanking Configuration 2B can result in an SSB placement that does not save any unused PRBs. Accordingly, in an alternate implementation, the system can be configured for SSB placement as follows:

SSB Start="SSB to Point A (number of RBs in terms of SCS 15 kHz)–Left side"+kssb; and SSB starts from PRB #4 to PRB #23, RBG #0/RBG #1/RBG #2.

In thus configuration, there are 4 unused PRBs: PRBs 0/1/2/3.

TABLE 13

| ARFCN of valid SSB | SSB Center Frequency (MHz) | SB to Point A (number of RBs in terms of SCS 15 kHz) - Left side | SB end PRB - Right side | kssb (number of subcarriers of subcarrierSpacing) (should be an integer between 0 to 23) | SB left edge to Point A distance (kHz) | M |
| --- | --- | --- | --- | --- | --- | --- |
| 399610 | 1998.05 | 3 | 23 | 12 | 720 | M = 1 |

TABLE 14

| Carrier center frequency (MHz) | Carrier Bandwidth (RBs) | subcarrierSpacing (kHz) |
| --- | --- | --- |
| 2007.5 | 133 | 15 |

TABLE 15

| ARFCN of PointA | Frequency (MHz) |
| --- | --- |
| 399106 | 1995.53 |

In the SSB placement implementations described herein, an exemplary advantage is that placing the SSB close to the blanked region is safe in terms of spectrum leakage and other RU related issues. As the implementations are in a DL carrier frequency, the transmitter can cause interference to the victim system (existing satellite services). So, in the blanked region if the transmitter is not transmitting any data there is no issue with respect to placing the SSB close to the blanking region. As described herein, as the SSB is placed at least 2PRBs apart from the blanking region, the SSB does not cause any leakage to the blanked region.

Optimal PRB Usage in PRB Blanking Configuration 2A

In the PRB Blanking Configuration 2A described above, two RBGs are blanked: RBG #9 and RBG #10. Because of the RAT0 bitmap-based allocation, in the RBG #9 there are SPRBs that are not blanked yet are unused, and in RBG #10 there are 6PRBs that are not blanked and yet not used. Thus, a total of 11PRBs are unused.

In the same system bandwidth for PRB Blanking Configuration 2A, due to the SSB occupying 20PRBs, there are 2 unused PRBs because of RAT0 bitmap-based allocation. For example, out of 20PRBs of SSB, starting from the granularity of RBG size, the SSB occupies two RBGs, 16PRBs and another RBG with 4PRBs, so there are 4PRBs unused. So, in the same system bandwidth with PRB Blanking Configuration 2A, there are 15 total unused PRBs in the system bandwidth: 11PRBs unused because of blanking plus 4PRBs unused because of the SSB.

Typically, in the 5G systems, the SSB occupies 20PRBs and 4 symbols, and this region is completely occupied for control signals/channels. This region is not used for a UE data channel. In an implementation, the system is configured to avoid or reduce unused PRBs.

In an implementation an SSB starts from PRB #84 and ends in PRB #103. The SSB occupies RBG #10, RBG #11 and RBG #12 (total three RBGs used—see "PRB Blanking Configuration 2A/3A SSB placement optimization above). Accordingly, the PRBs wasted due to SSB placement are 2 PRBs (PRB #82/#83 unused, #80/#81 are blanked) in RBG #10. In a further implementation, the system can configured to place the SSB in RBG #10 where 6PRBs (PRBs #82/#83/#84/#85/#86/#87) are unused, along with another SSB placement of RBG 8PRBs (RBG #11) and 8PRBs from a next RBG (RBG #12). With this configuration a total of 7 PRBs are unused in the system bandwidth: SPRBs unused because of blanking in RBG #9 and 2PRBs unused because of the SSB in RBG #10. As such, 8PRBs can be saved and used.

However the CSI-RS/T-RS/CSI-IM can occupy the biggest chunk (PRB #0 to PRB #76) in the system bandwidth. Optimal PRB in Usage PRB Blanking Configuration 2B In the PRB Blanking Configuration 2B described above, 2 RBGs are blanked: RBG #9 and RBG #10. Because of the RAT0 bitmap-based allocation, in the RBG #9 there are SPRBs that are not blanked yet are unused, and in RBG #10 there are 3PRBs that are not blanked and yet not used. Thus, a total of 8PRBs are unused.

In the same system bandwidth for PRB Blanking Configuration 2B, due to the SSB Block's 20PRBs, 4PRBs are unused because of RAT0 bitmap-based allocation. For example, out of 20PRBs of SSB, starting at RBG size, the SSB occupies 2 RBGs, 16PRBs and another RBG with 4PRBs, so there are 4PRBs unused.

So, in the same system bandwidth with PRB Blanking Configuration 2B, there are 12 total unused PRBs in the system bandwidth: 8PRBs unused because of blanking plus 4PRBs unused because of the SSB.

In an implementation, the system can be configured to avoid or reduce unused PRBs in PRB Blanking Configuration 2B.

In an implementation an SSB starts from PRB #90 and ends in PRB #110. The SSB occupies RBG #11, RBG #12 and RBG #13 (see "PRB Blanking Configuration #2.B/3.B"

in the SSB placement optimization above at "SSB" and FIG. 6A). Accordingly, the unused PRBs due to SSB placement is 6PRBs: 3 PRBs (PRB #85/86/87 unused, #80/81/82/83/84 blanked) in RBG #10 plus 2 PRBs (PRB #88/89) in RBG #11, plus another 1 PRB (PRB #111) in RBG #13. In a further implementation, the system can be configured place the SSB in RBG #11 where there are 6 unused PRBs (PRB #90/91/92/93/94/95), along another 1 RBG having 8PRBs (RBG #12) and 6PRBs from a next RBG (RBG #13). With this configuration a total of 11PRBs are unused in the system bandwidth: SPRBs unused because of blanking in RBG #9 plus RBG #10 where 3PRBs are unused, plus another 2PRBs unused because of SSB in RBG #11, and an additional 1PRB unused because of the SSB in RBG #13. As such, 1PRB is saved and used.

Alternate Solution: PRB Blanking Configuration 2B/3B: with SSB CORESET #0 and CORESET #1 in separate part of the Bandwidth.

As described herein for PRB Blanking Configuration 2B, the optimized SSB placement will not save any unused PRBs. Accordingly, in alternate implementation, the SSB starts from PRB #4 to PRB #23, RBG #0/RBG #1/RBG2. As such, the number of unused PRBs are 4PRBs (PRB #0/1/2/

In PRB Blanking Configuration 2A, 17PRBs are blanked; almost 5.1 Watts (12.75%) power is under-utilized.

In PRB Blanking Configuration 2B, 20PRBs are blanked; almost 6 Watts (15%) power is under-utilized.

In PRB Blanking Configuration 3A, 5PRBs are blanked; almost 1.5 Watts (3.75%) power is under-utilized.

In PRB Blanking Configuration 3 B, 8PRBs are blanked; almost 2.4 Watts (6%) power is under-utilized.

In an implementation, the system can be configured with the following parameters for DL Power control.

1. ss-PBCH-BlockPower: SIB1 param a. Average EPRE of the resources elements that carry secondary synchronization signals in dBm that the NW used for SSB transmission (see TS 38.213 [13], clause 7).

b. The downlink SS/PBCH SSS EPRE can be derived from the SS/PBCH downlink transmit power given by the parameter ss-PBCH-BlockPower provided by higher layers. The downlink SSS transmit power is defined as the linear average over the power contributions (in [W]) of all resource elements that carry the SSS within the operating system bandwidth.

TABLE 16

| ServingCellConfigComnon ::• | SEQUENCE |
| --- | --- |
| physCellId | PhyeCellid |
| downlinkconfigcommon | DownlinkConfigCommon |
| uplinkConfigCommon | UplinkConfigCommon |
| supplementaryuplinkconfig | UplinkConfigCommon |
| n-TimingAdvanceOffset | ENUMERATED (n0, n25600, n39936) |
| ssb-PositionsInBurst | CHOICE { |
| shorteitmap | BIT STRING (SIZE (4)), |
| med1UltBitmap | BIT STRING (SIZE (8)), |
| longBitmap | BIT STRING (SIZE (64)) |
| } | ENUMERATED { ms5, ms10, ms20, ms40 ms80, ms160, spare2, spare } |
| ssb-periodicityServingCell | ENUMERATED {pos2, pos3}, |
| dmrs•TypeA•Position | SetupRelease { Rate MatchPatternLTE-CRS } |
| lte-CRS-ToMatchAround | SEQUNCE (SIZE (1 .. maxNrofRateMatchPatterns ))OF RateMatchPattern |
| rateMatch Pattern ToAddModList | SEQUENCE (SIZE (1 .. maxNrofRateMatchPatterns)) OF RateMatchPatternid |
| rateMatchPatternToReleaseList | ssbSubcarrierspacing |
| ssbSubcarrierspacing | TDD-UL-DL-Configurationcommon |
| tdd-UL-DL-Configurationcommon | INTIGER (–60 .. 50), |
| ss-PBCH-BlockPower | |
| ... | |
| } | |

3). In the implementation, CORESET #0 starts from PRB #4 to PRB #27, RBG #0/RBG #1/RBG2/RBG #3 and CORESET #1 starts from PRB #0 to PRB133. Blanking is from PRB #77 to PRB #84. In the CORESET #1 frequency domain bitmap, btmap #12/13/14 are disabled to accommodate the PRB blanking from PRB #77 to PRB #84.

DL Power Allocation

Implementations as described herein can be further configured to minimize or avoid underutilization and inefficient use of power from PRB blanking. For example, a RU can be a 4T4R system with a 46 dBm (40 Watts) transmit power. For a 25 MHz BW/133PRBs, each PRB will be able to transmit about 0.3 W power. As such:

In PRB Blanking Configuration 1, 12PRBs are blanked; almost 3.6 Watts (9%) power is under-utilized.

2. To boost CSI-RS power by RRC parameter "power-ControlOffsetSS"

a. Power offset of NZP CSI-RS RE to SSS RE. Value in dB (see TS 38.214 [19], clause 5.2.2.3.1).

b. powerControlOffsetSS: which is the assumed ratio of NZP CSI-RS EPRE to SS/PBCH block EPRE.

c. The downlink CSI-RS EPRE can be derived from the SS/PBCH block downlink transmit power given by the parameter ss-PBCH-BlockPower and CSI-RS power offset given by the parameter powerControlOffsetSS provided by higher layers. The downlink reference-signal transmit power is defined as the linear average over the power contributions (in W) of the resource elements that carry the configured CSI-RS within the operating system bandwidth.

TABLE 17

| NZP-CSI-RS-Resource: : ■ | SEQUENCE { | |
| --- | --- | --- |
| nzp-CSI-RS-ResourceId | nzp-CSI-RS-ResourceId, CSI-RS- | |
| resourceMapping | ResourceMapping | |
| | INTERGER (–8..15}, | OPTIONAL - - Need R |

TABLE 17-continued

| powerControlOffset | ENUMERATED(db–3,db0, db3,db6} |
| powerControlOffsetSS | scramblingId, |
| scramblingID | |

1. If the UE is not configured for periodic CSI-RS reception, referenceSignalPower is provided by ss-PBCHBlockPower. If the UE is configured periodic CSI-RS reception, referenceSignalPower is provided either by ss-PBCH-BlockPower or by powerControlOffsetSS providing an offset of the CSI-RS transmission power relative to the SS/PBCH block transmission power [TS 38.214]. If powerControlOffsetSS is not provided to the UE, the UE assumes an offset of 0 dB.

2. The ratio of PDSCH EPRE to DM-RS EPRE is determined by parameter "the number of DM-RS CDM groups" (based on parameters dmrs-AdditionalPosition, maxLength and dmrs-Type). DMRS power will change with PDSCH power.

For downlink DM-RS associated with PDSCH, the UE can assume the ratio of PDSCH EPRE to DM-RS EPRE $\beta_{DRMS}$[dB] as given by Table 18 according to the number of DM-RS CDM groups without data as described in subclause 5.1.6.2. The DM-RS scaling factor $$\beta_{PDSCH}^{DMRS}$$

specified in Subclause 7.4.1.1.2 of [4, TS 38.211] is given by $$\beta_{PDSCH}^{DMRS} = 10^{\beta_{DRMS}/20}$$

TABLE 18

| Number of DM-RS DCM groups without data | DM-RS configuration type 1 | DMRS configuration type 2 |
| --- | --- | --- |
| 1 | 0 dB | 0 dB |
| 2 | –3 dB | –3 dB |
| 3 | | –4.77 dbB | a. powerControlOffset: which is the assumed ratio of PDSCH EPRE to NZP CSI-RS EPRE when UE derives CSI feedback and takes values in the range of [–8, 15] dB with 1 dB step size.

DL Power Allocation Solutions

Disclosed are implementations to optimize DL Power allocation.

In an implementation: the system is configured for equal distribution of power for all remaining PRBs to provide a coverage boosting solution.

In another implementation: the system is configured for a performance boosting solution. First, the system is configured to provide equal distribution of power for all remaining PRBs. Next, the system is configured to power boost the CSI-RS and PDSCH EPRE to DMRS EPRE ratio. The power boosting can be achieved in the digital domain by boosting the IQ signal using DBFS scaling parameters. The digital domain power scaling can be configured to implement a per EPRE power limitation for a RU. As a vendor RU can have a per EPRE power limitation, the system can be configured to meet the limitation while power scaling to avoid the overflow of the power.

Coverage Boosting Solution

In an implementation, unused power from blanked PRB can be distributed among the non-blanked PRBs equally. By distributing the equal power to all remaining PRBs, the SSB, CSI-RS/T-RS, CORESET-0/CORESET-1 and PDSCH, Data RE and DMRS RE, power is advantageously boosted equally and proportionally, while the ratios remain same. Boosting equal power for all remaining PRBs advantageously boosts the coverage of the cell. An exemplary implementation of coverage boosting follows.

Equal Per RE Power Boosting

Per PRB power for 40 W RU with 3 W wastage for 133PRBs=0.3 W=24.77 dBm

Per RE power=0.3 W/12=0.025 W=13.97 dBm

Per PRB power for 40 W RU without 3 W wastage for 113PRBs (133PRBS in BW–20PRBs blanked)=0.354 W=25.49 dBm Per RE power=0.354 W/12=0.0295 W=14.69 dBm In the implementation, unused power from blanked PRBs are distributed among the non-blanked PRBs. After power boosting, per RE power is improved from 10.96 dBm to 11.7 dBm.

SSB EPRE

The SSB power can be calculated as follows:

SSB Ref Power=RU_POWER(dBm)–10 log 10(NUM_ANT)–10 log 10(RB_TOT*12)

RU_POWER=RU power for the that carrier in dBm unit
RB_TOT total number of RBs in the bandwidth
NUM_ANT=number of antennas
(or)

SSB Ref Power in Watts=(RU POWER in Watts/NUM_ANT)/RB_TOT*12

SSB Ref Power in Watts convert in to dBm.
SSB power before boosting:

SSB Ref Power=46 dBm–6–10 log 10(133*12)=7.97 dBm

SSB power after boosting for 20PRB blanking:

SSB Ref Power=46 dBm–6–10 log 10(113*12)=8.68 dBm

The value for the SSB EPRE can be rounded to 9 dBm.

Cell coverage or the link budget for coverage depends on and is restricted by UL link budget of the cell. An exemplary advantage of the coverage boosting implementation is that the DL coverage boosting feature can be beneficial where there is a headroom or margin UL link budget, as the cell coverage is not planned to the full capacity of the UL link budget. For example, if the UL link budget is 500 meters, but the cell coverage is planned for 400 meters, then there is a margin of 100 meters. For a link budgeted configuration, the implementation of coverage boosting improves the DL cell coverage and match with UL cell coverage or link budget.

Performance Boosting Solution

In an implementation, the system can be configured for a performance boosting solution.

First, the system is configured to perform equal distribution of power for all remaining PRBs. For example, a RU is 40 W and can be deployed as a 300 meters cell coverage. Using this configuration and PRB Blanking Configuration 2B as an example, the unutilized power to boost the transmission power in the remaining 113PRBs. Assume the coverage is becomes 350 meters, but SSB power remains not boosted, and remains same for 40 W RU and 300 meters cell coverage (SSB power depends on the maximum output power of RU).

Next, the system can be configured to boost the power of the CSI-RS and PDSCH EPRE to DMRS EPRE ratio. To boost the CSI-RS power, the power for boosting CSI-RS is taken from the REs in the same OFDM symbol of the CSI-RS. The boosted CSI-RS advantageously gives better CQI report for cell edge UEs. The CSI-RS can be transmitted in full bandwidth and at 4 REs per RB. For a four-antenna port CSI-RS, 4REs are in the OFDM symbol in which the CSI-RS is placed. A CSI-IM resource is allocated in full bandwidth and 4 REs per RB. For a four antenna port CSI-IM in a OFDM symbol, 4REs can be used. A CSI-IM is a zero power CSI configuration, where in the RS RE there will not be any signal transmitted. So, within a PRB, 8REs are used for CSI-RS and CSI-IM, whereas the 4REs are unused.

Two exemplary implementations of a power boosting solution include:

1. A CSI-RS/CSI-IM symbol used only for RS, and not for PDSCH multiplexing. For example, if OFDM Symbol #13 is used for CSI-RS (4 REs for 4 antenna port) and CSI-IM (4 REs for 4 antenna port), then the system can be configured to take power from CSI-IM REs and/or the remaining 4 unused REs and boost the CSI-RS in accord with specification-based granularity if sufficient power is available.

2. A CSI-RS/CSI-IM symbol used for RS and multiplexed with PDSCH. For example, if OFDM Symbol #13 is used for CSI-RS (4 REs for 4 antenna port) and CSI-IM (4 REs for 4 antenna port), and the remaining 4 unused REs are used for PDSCH data, then the system is configured to take power from only the CSI-IM REs (not from the remaining 4 unused REs) and boost the CSI-RS in accord with specification-based granularity if sufficient power is available.

TABLE 19

| NZP-CSI-RS-Resource: : ∎ | SEQUENCE { |
|---|---|
| nzp-CSI-RS-ResourceId | nzp-CSI-RS-ResourceId, CSI-RS- |
| resource Mapping | ResourceMapping |
| powerControlOffset powerControlOffsetSS | INTERGER (−8..15}, |
| scramblingID | ENUMERATED(db−3,db0, db3,db6} |
| periodicityAndOffset | ScramblingId, |
| qcl-InfoPeriodCSI-RS | CSI-periodicityAndOffset |
| ... | TCI-StateId |
| } | |

Power boosting is executed in the granularity of −3 dB, 0 dB, 3 dB and 4 dB power offset to SSS RE.

As explained above, in a first step for power boosting, all non-blanked PRBs are equally boosted, so the PDSCH data and DMRS RE power is boosted. An exemplary advantage is better PDSCH decoding in the UE side. Next, in a second step, a two symbol DMRS can be boosted. The system is configured to take the power to boost DMRS from the PDSCH Data REs. Then, the PDSCH Data EPRE will be decreased, and the coverage is reduced for PDSCH data. As there are 6REs used in one symbol for DMRS, a total of 12REs used for two symbol DMRS.

Next, the system is configured to reduce coverage as substantially the same as SSB power of 300 meters. Two exemplary implementations for power boosting include:

1. For a slot in which CSI-RS and PDSCH is occurring, the system is configured to boost the CSI-RS and the PDSCH.

2 For a slot in which only the PDSCH is occurring, PDSCH is boosted:

For downlink DM-RS associated with PDSCH, the UE may assume the ratio of PDSCH EPRE to DM-RS EPRE $\beta_{DRMS}$ [dB] is given by Table 20 according to the number of DM-RS CDM groups without data as described in Subclause 5.1.6.2 of [3GPP TS 38.211]. The DM-RS scaling factor $$\beta_{PDSCH}^{DMRS}$$

specified in Subclause 7.4.1.1.2 of [3GPP TS 38.211] is given by $$\beta_{PDSCH}^{DMRS} = 10^{\beta_{DRMS}/20}$$

TABLE 20

| Number of DM-RS DCM groups without data | DM-RS configuration type 1 | DMRS configuration type 2 |
|---|---|---|
| 1 | 0 dB | 0 dB |
| 2 | −3 dB | −3 dB |
| 3 | | −4.77 dbB |

As shown in Table 20, typically, the configuration is −3 dB lesser than the PDSCH DMRS for DM-RS configuration type1. The DM-RS configuration type 2 can be enabled and configured to be −4.77 dB less than the PDSCH DMRS, so 1.77 dB is boosted for DMRS compared previous configuration. For this power boosting, the system implements a configuration with DM-RS configuration type2 support and DM-RS CDM groups without data equal to 3.

An exemplary net effect is similar to when the SSB/PDSCH data EPRE is configured for 300 meters. However as CSI-RS and DMRS is boosted, so the system advantageously has better CQI reports and better decoding of PDSCH in the UE side, including for cell edge UEs. The system can boost the CSI-RS and DMRS such way that PDSCH data EPRE power remains same as 300 meters.

An example of DMRS Power Boosting is as follows:

Per PRB power for 40 W RU with 3 W wastage for 133PRBs=0.3 W=24.77 dBm

Per RE power=0.3 W/12=0.025 W=13.97 dBm

Per PRB power for 40 W RU without 3 W wastage for 113PRBs (133PRBS in BW–20PRBs blanked)=0.354 W=25.49 dBm Per RE power=0.354 W/12=0.0295 W=14.69 dBm PDSCH REs total power=12 SC×11 symbols (14 symbols–2PDCCH–1CSIRS/CSIIM)=132REs=132× 0.0295 W=3.894 W PDSCH DMRS REs total=6REs×2 Symbols=12Res PDSCH Data REs total=132REs–12RES DMRS=120 Res Per RE power for PDSCH DMRS after boosting=0.0295 W=14.69 dBm+1.77 dB (from 3 dB ratio to 4.77 dB ratio)=16.46 dBm (0.0443 W)

PDSCH DMRS REs total power, after DMRS boosting=12×0.0443 W=0.5316 W

PDSCH Data REs total power, after DMRS boosting=3.894 W–0.5316 W=3.3624 W

Per RE power for PDSCH Data REs after DMRS boosting=3.3624 W/120=0.02802 W=14.47 dBm After DMRS power boosting PDSCH data REs power is changed from 14.69 dB to 14.47 dBm.

In an implementation, the system is configured to utilize unused PRBs. One or more RBGs which are blanked can have one or more PRBs which are not part of the blanking configuration. For example, the unused PRBS can be used for any short message transmission in downlink.

An example is given for utilizing the unused PRBs for Msg2. An exemplary Msg2/RAR Grant PRB Requirement is that if the Sub6 SA FDD, the requirement for Msg2/RAR Grant is 4PRBs.

In both PRB Blanking Configuration 2A and PRB Blanking Configuration 2B as described herein, there are SPRBs unused. These two SPRBs chunks can be used for Msg2/ RAR grant transmission in DL using RAType1. Accordingly Msg2 is chosen because before an attach operation, there is no UE specific RAType configuration executed for a UE, so there is no mandate for gNB scheduler to use a particular RAType. So, for Msg2 the scheduler can use RAType1 and DCI1_0 if the UE supports it. For the other UEs, the scheduler can use RAType1 and DCI1_1.

In an example, unused PRBs are used for slot aggregation. In an implementation, unused PRBs can be used to transmit data to UEs in downlink in multi-slot transmission mode. Multi-slot transmission advantageously avoids fragmentation of RLC SDU to multiple small packets or transport blocks due to a small number of unused PRBs by allowing the data to span across multiple time slots thus more resources. Cell edge UEs advantageously benefit from multi-slot transmission on these unused resources.

It will be understood that implementations and embodiments can be implemented by computer program instructions. These program instructions can be provided to a processor to produce a machine, such that the instructions, which execute on the processor, create means for implementing the actions specified herein. The computer program instructions can be executed by a processor to cause a series of operational steps to be performed by the processor to produce a computer-implemented process such that the instructions, which execute on the processor to provide steps for implementing the actions specified. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. The foregoing examples should not be construed as limiting and/or exhaustive, but rather, an illustrative use case to show an implementation of at least one of the various embodiments.

The invention claimed is:

1. A method, comprising:

configuring, at a base station operating in a carrier bandwidth, a Physical Resource Block (PRB) Blanking Configuration for at least one PRB blanking region for a protection zone in the carrier bandwidth;

the base station being configured to add one or more PRBs to a predefined blanking frequency and vary the size of a blanking region for the PRBs, wherein the base station is further configured for a PRB Blanking Configuration that blanks a plurality of the PRB blanking regions for a plurality of protection zones in the carrier bandwidth, and wherein the PRB Blanking configuration comprises an edge PRB blanking region at the edge of the carrier bandwidth and a middle PRB blanking region in the middle of the carrier bandwidth.

2. The method of claim 1, further comprising:

identifying one or more Resource Block Groups (RBG) for the PRB blanking region not being used for scheduling a data transmission; and blanking the PRBs in the carrier bandwidth that overlap with the one or more RGBs that are not being used for the scheduling the data transmission.

3. The method of claim 2, further comprising:

identifying one or more non-blanked PRBs in an RBG that is not used for scheduling a data transmission, wherein one or more RBGs which are not used for scheduling the data transmission comprises one or more PRBs that are not blanked for the at least one PRB blanking Configuration.

4. The method of claim 3, further comprising:

determining if a plurality of contiguous PRBs are available for signal transmission;

scheduling a MSG2/RAR in the contiguous PRBs when the plurality of contiguous PRBs are available for signal transmission; and scheduling data in the unused PRBs for multi-slot transmission to UEs in the DL.

5. The method of claim 3, wherein the system is further configured to at least:

determine if a plurality of contiguous PRBs are available for signal transmission; and if so, scheduling a Msg2/RAR (Message-2/Random Access Response) in the contiguous PRBs.

6. The system of claim 5, wherein the system is further configured to at least:

identify unused PRBs; and schedule data in the unused PRBs for multi-slot transmission to UEs (User Equipment) in the DL.

7. The method of claim 1, further comprising:

transmitting control channels and reference signals in the non-blanked PRB regions.

8. The method of claim 7, wherein the control channels and reference signals include:

a Synchronization Signal/PBCH block (SSB), a Physical Downlink Control Channel (PDCCH), a CSI-RS (Channel State Information-Reference Signal),
a CSI-IM (Channel Status Information Interference Measurement Reference Signal),
a T-RS (Tracking Reference Signal),
or any combination thereof.

9. The method of claim 8, further comprising:
distributing unused power from the blanked PRBs and distributing the power across non-blanked PRBs.

10. A system, comprising:
a base station operating in a shared spectrum comprising a Downlink (DL) scheduler configured to blank Physical Resource Blocks (PRBs) for a PRB Blanking Configuration, the base station being configured to add one or more PRBs to a predefined blanking frequency and vary the size of a blanking region for the PRBs,
wherein the base station is further configured for a PRB Blanking Configuration that blanks a plurality of the PRB blanking regions for a plurality of protection zones in the carrier bandwidth, wherein the PRB Blanking Configuration comprises an edge PRB blanking region at the edge of the carrier bandwidth and a middle PRB blanking region in the middle of the carrier bandwidth.

11. The system of claim 10, further comprising:
the DL scheduler being configured with Resource Allocation Type 0 (RATO), the DL scheduler being configured to schedule or allocate the PRBs by using the RATO based on a User Equipment's PRB requirements such that there is no PRB wastage in a Transit Time Interval.

12. The system of claim 10, further comprising:
wherein the DL scheduler is configured with a Dynamic Switch to switch between a plurality of Resource Allocation Types (RATs) and schedule or allocate PRBs by dynamically switching between the plurality of RATs based on a User Equipment's PRB requirements such that there is no PRB wastage in a Transit Time Interval.

13. The system of claim 10, wherein the base station is further configured to at least:
identify one or more Resource Block Groups (RGB) for the PRB blanking region not being used for scheduling a data transmission; and
blank the PRBs in the carrier bandwidth that overlap with the one or more RGBs that are not being used for the scheduling the data transmission.

14. The system of claim 10, wherein the base station is further configured to transmit control channels and reference signals in the non-blanked PRB regions.

15. The system of claim 14, wherein the base station is further configured to at least:
identify one or more non-blanked PRBs in a RBG that is not used for scheduling a data transmission, wherein one or more RBGs which are not used for scheduling the data transmission comprises one or more PRBs that are not blanked for the at least one PRB Blanking Configuration.

16. The system of claim 15, wherein the system is further configured to distribute the unused power from the blanked PRBs equally across the non-blanked PRBs.

17. The system of claim 16, wherein the system is further configured to perform at least one operation selected from the operations of:
boosting a CSI-RS (Channel State Information-Reference Signal) signal after distributing the power equally across the non-blanked PRBs;

boost the CSI-RS signal by taking the power from REs in the same OFDM (Orthogonal Frequency-Division Multiplexing) symbol of the CSI-RS;
after distributing the power equally across the non-blanked PRBs, boosting a PDSCH Energy Per Resource Element (EPRE) to a Demodulation Reference Signal (DMRS) EPRE ratio;
not boost the SSB power and keep the SSB power for a given Transmit power of Radio Unit (RU) and a cell coverage;
place the SSB in a PRB to avoid the total number of PRBs wasted; and
place the SSB to overlap with unused PRBs created by the PRB blanking in the carrier bandwidth such that the total number of unused PRBs is less than when the SSB is placed at a lower edge of the bandwidth.

18. A system, comprising:
a base station operating in a shared spectrum comprising a Downlink (DL) scheduler configured to blank Physical Resource Blocks (PRBs) for a PRB Blanking Configuration, the base station being configured to add one or more PRBs to a predefined blanking frequency and vary the size of a blanking region for the PRBs,
wherein the base station is further configured to at least:
identify a range of PRBs each at least one PRB blanking region;
identify one or more Resource Block Groups (RGB) that can be used for scheduling;
identify the one or more RGBs for the PRB blanking region that cannot be used for scheduling;
calculate a number of RGBs in the carrier bandwidth, the calculating being the number of PRBs in the carrier bandwidth divided by an RGB size;
identify a starting RGB that overlaps with the first PRB in the PRB blanking region, the identification being by calculating a starting PRB for the range of PRBs in the at least one PRB blanking region divided by the RGB size;
calculate the number of PRBs in the at least one PRB blanking region, wherein the calculating the number of the at least one PRB blanking region is by calculating from the end PRB for the range of PRBs in the at least one PRB blanking region minus the starting RGB that overlaps with the first PRB in the PRB blanking region plus an additional PRB;
start the PRB blanking from the starting RGB, wherein the operation starts by calculating the RGB floor multiplied by the RGB size to obtain a number of PRBs in the PRB blanking region that overlaps with the first RGB;
calculate the number of PRBs in the blanking region overlapping the RGB, wherein the calculation is the RGB size minus the number of the PRB in the blanking region that overlaps with the first RGB of the blanking region overlapping RGB; and
calculate the number of PRBs required from the next RGB, the calculation being the number of PRBs in the at least one PRB blanking region minus the number of PRBs in the blanking region overlapping the RGB.

19. A method, comprising:
configuring, at a base station operating in a carrier bandwidth, a Physical Resource Block (PRB) Blanking Configuration for at least one PRB blanking region for a protection zone in the carrier bandwidth, the base station being configured to add one or more PRBs to a predefined blanking frequency and vary the size of a blanking region for the PRBs;

identifying one or more Resource Block Groups (RGB) for the PRB blanking region not being used for scheduling a data transmission;

blanking the PRBs in the carrier bandwidth that overlap with the one or more RGBs that are not being used for the scheduling the data transmission;

distributing unused power from the blanked PRBs and distributing the power across non-blanked PRBs;

determine if a plurality of contiguous PRBs are available for signal transmission; and if so, scheduling a Msg2/RAR (Message-2/Random Access Response) in the contiguous PRBs.

20. A system, comprising:

a base station operating in a shared spectrum comprising a Downlink (DL) scheduler configured to blank Physical Resource Blocks (PRBs) for a PRB Blanking Configuration, the base station being configured to at least:

add one or more PRBs to a predefined blanking frequency and vary the size of a blanking region for the PRBs;

transmit control channels and reference signals in the non-blanked PRB regions; and identify one or more non-blanked PRBs in a RBG that is not used for scheduling a data transmission, wherein the one or more RBGs which are not used for scheduling the data transmission comprises one or more PRBs that are not blanked for the PRB Blanking Configuration;

wherein the system is further configured to distribute the unused power from the blanked PRBs equally across the non-blanked PRBs, and wherein the system is further configured to perform at least one operation selected from the operations of:

boosting a CSI-RS (Channel State Information-Reference Signal) signal after distributing the power equally across the non-blanked PRBs;

boosting the CSI-RS signal by taking the power from REs in the same OFDM (Orthogonal Frequency-Division Multiplexing) symbol of the CSI-RS;

after distributing the power equally across the non-blanked PRBs, boosting a PDSCH Energy Per Resource Element (EPRE) to a Demodulation Reference Signal (DMRS) EPRE ratio;

keeping the SSB power for a given Transmit power of Radio Unit (RU) and a cell coverage;

placing the SSB in a PRB to avoid the total number of PRBs wasted; and placing the SSB to overlap with unused PRBs created by the PRB blanking in the carrier bandwidth so that the total number of unused PRBs is less than when the SSB is placed at a lower edge of the bandwidth.

* * * * *